United States Patent
Okabe et al.

(10) Patent No.: US 12,260,764 B2
(45) Date of Patent: Mar. 25, 2025

(54) PARKING SUPPORT DEVICE AND PARKING SUPPORT METHOD

(71) Applicant: Panasonic Intellectual Property Management Co., Ltd., Osaka (JP)

(72) Inventors: Yoshimasa Okabe, Kanagawa Ken (JP); Hiroto Sankoda, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 240 days.

(21) Appl. No.: 18/099,727

(22) Filed: Jan. 20, 2023

(65) Prior Publication Data

US 2023/0245566 A1    Aug. 3, 2023

(30) Foreign Application Priority Data

Jan. 28, 2022    (JP) .................................. 2022-011503

(51) Int. Cl.
   *G08G 1/16*    (2006.01)

(52) U.S. Cl.
   CPC ................................... *G08G 1/168* (2013.01)

(58) Field of Classification Search
   CPC ........................... G08G 1/168; B62D 15/0285
   USPC ........................................................ 701/36
   See application file for complete search history.

(56) References Cited

U.S. PATENT DOCUMENTS

| | | | | |
|---|---|---|---|---|
| 7,012,549 B2 * | 3/2006 | Mizusawa | ............ | B62D 15/028 340/932.2 |
| 2008/0010018 A1 * | 1/2008 | Satonaka | ........... | B62D 15/0285 701/300 |
| 2018/0370566 A1 * | 12/2018 | Kojo | ....................... | B60R 21/00 |

FOREIGN PATENT DOCUMENTS

| | | | |
|---|---|---|---|
| CN | 110444044 | 11/2019 | |
| DE | 102012014207 | 1/2014 | |
| DE | 102018104185 A1 * | 8/2018 | ........ B60W 30/0956 |
| EP | 3929046 | 12/2021 | |

(Continued)

OTHER PUBLICATIONS

Office Action from Japan Patent Office (JPO) in Japanese Patent Appl. No. 2022-011503, dated Feb. 27, 2024, together with an English language translation.

(Continued)

*Primary Examiner* — Muhammad Shafi
(74) *Attorney, Agent, or Firm* — Greenblum and Bernstein, P.L.C.

(57) ABSTRACT

A parking support device includes: an acquisition circuit configured to acquire first detection points related to obstacles around a vehicle before setting a parking direction, and acquire second detection points related to the obstacles after setting the parking direction; an analysis circuit configured to calculate first approximate straight lines and first variations for first detection point groups related to the first detection points, and calculate second approximate straight lines and second variations for second detection point groups related to the second detection points; a setting circuit configured to set a parking point based on the first detection points, and set the parking direction based on the first approximate straight lines and the first variations; and a correction circuit configured to correct the parking direction using a correction amount calculated using the second approximate straight lines weighted based on the second variations after setting the parking direction.

10 Claims, 30 Drawing Sheets

(56) References Cited

FOREIGN PATENT DOCUMENTS

| | | |
|---|---|---|
| JP | 2006-193014 | 7/2006 |
| JP | 2014-034321 | 2/2014 |
| JP | 2014-034322 | 2/2014 |
| JP | 2014-156201 | 8/2014 |
| JP | 2019-020769 | 2/2019 |
| WO | WO-2009157298 A1 * 12/2009 | ........... B62D 15/027 |

OTHER PUBLICATIONS

Office Action from Japan Patent Office (JPO) in Japanese Patent Appl. No. 2022-011503, dated Nov. 21, 2023, together with an English language translation.

* cited by examiner

PARKING SUPPORT DEVICE AND PARKING SUPPORT METHOD

CROSS-REFERENCE TO RELATED APPLICATIONS

This application is based upon and claims the benefit of priority from Japanese Patent Application No. 2022-011503, filed on Jan. 28, 2022, the entire contents of which are incorporated herein by reference.

FIELD

The present disclosure relates to a parking support device and a parking support method.

BACKGROUND

Japanese Patent Application Laid-open No. 2014-34321 discloses a parking support device that causes a vehicle to be parked in parallel with a direction along a side surface of an adjacent obstacle.

The parking support device disclosed in Japanese Patent Application Laid-open No. 2014-34321 detects positions of obstacles adjacent to the right and left of a vehicle to be parked by sonar, and in a case in which a section length along which a detected detection point group is arranged in a straight line exceeds a threshold, the parking support device causes the vehicle to be parked side by side along the direction of the straight line having the section length exceeding the threshold.

For example, in a case in which a rectangular column is present to the left or the right of a parking frame and a parked vehicle is present on the other side, the vehicle is preferably parked side by side along a side surface of the rectangular column because the side surface of the rectangular column is normally parallel to a long side of the parking frame. However, with the parking support device disclosed in Japanese Patent Application Laid-open No. 2014-34321, a parking direction is assumed to be, in a case in which the section length along which the detection point group is arranged in a straight line exceeds the threshold, a direction along the straight line having the section length, so that a direction along the parked vehicle having a longer side surface is set to be the parking direction. Thus, when an attitude of the parked vehicle is oblique with respect to the long side of the parking frame, it is difficult to park the vehicle side by side along the side surface of the rectangular column.

The present disclosure has an object to provide a parking support device and a parking support method that can perform automatic parking with a more appropriate vehicle attitude

SUMMARY

A parking support device according to the present disclosure is configured to support side-by-side parking of a vehicle in a parking region positioned to a side of a passage. The parking support device includes an acquisition circuit, an analysis circuit, a setting circuit, and a correction circuit. The acquisition circuit is configured to acquire information on detection points indicating positions at which obstacles around the vehicle are detected. The analysis circuit is configured to divide the detection points into detection point groups, calculate approximate straight lines each corresponding to one of the detection point groups, and calculate variations of detection points with respect to the approximate straight lines each calculated from one of the detection point groups. The setting circuit is configured to set a parking point at which the vehicle is to be parked based on the detection points, and set a parking direction that is to be a direction of the vehicle at the parking point, based on the approximate straight lines and the variations. The correction circuit is configured to correct the parking direction after setting the parking direction. The acquisition circuit is configured to acquire, from among the detection points, first detection points before setting the parking direction, and acquires second detection points after setting the parking direction. The analysis circuit is configured to divide the first detection points into first detection point groups, divide the second detection points into second detection point groups, calculate first approximate straight lines for the first detection point groups, calculates second approximate straight lines for the second detection point groups, calculate first variations of the first detection point groups with respect to the first approximate straight lines, and calculate second variations of the second detection point groups with respect to the second approximate straight lines. The setting circuit is configured to set the parking point based on the first detection points, and set the parking direction based on the first approximate straight lines and the first variations. The correction circuit is configured to weight the second approximate straight lines based on the second variations, calculate a correction amount of the parking direction using the weighted second approximate straight lines, and correct the parking direction using the correction amount.

DETAILED DESCRIPTION

First Embodiment

The following describes a first embodiment of a parking support device according to the present disclosure with reference to the drawings.

Schematic Configuration and Outline of Operation of Sonar Module

Figure 1A:
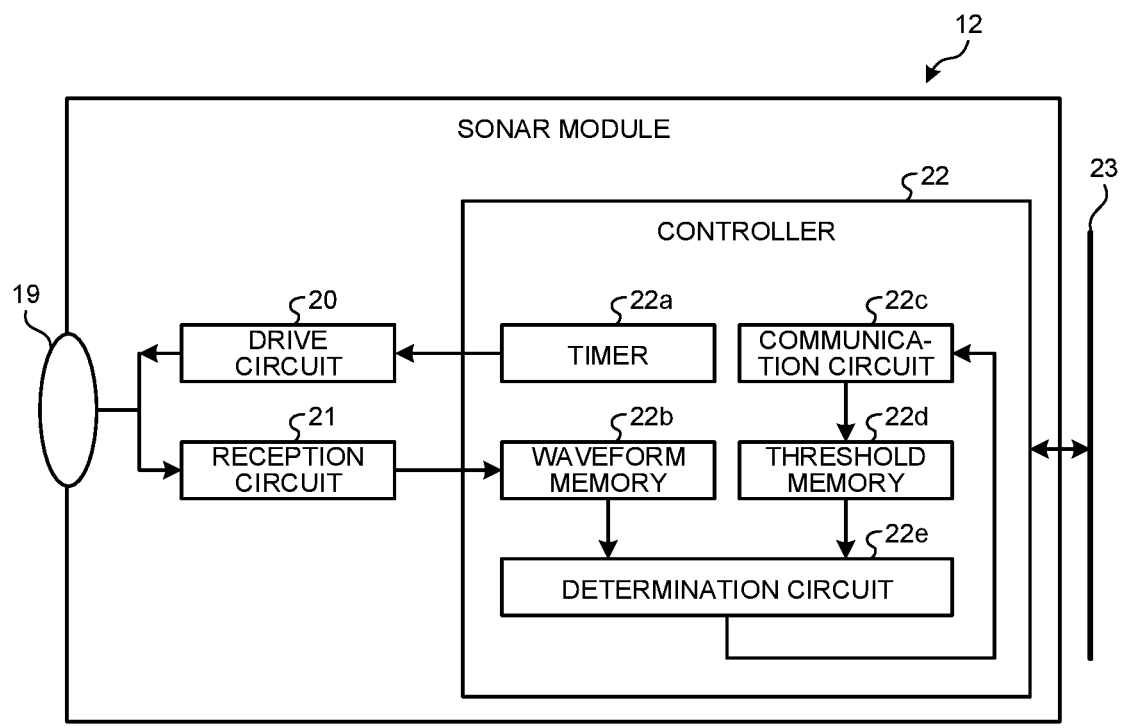
FIG. 1A is a block diagram illustrating a schematic configuration of a sonar module.
Figure 1B:
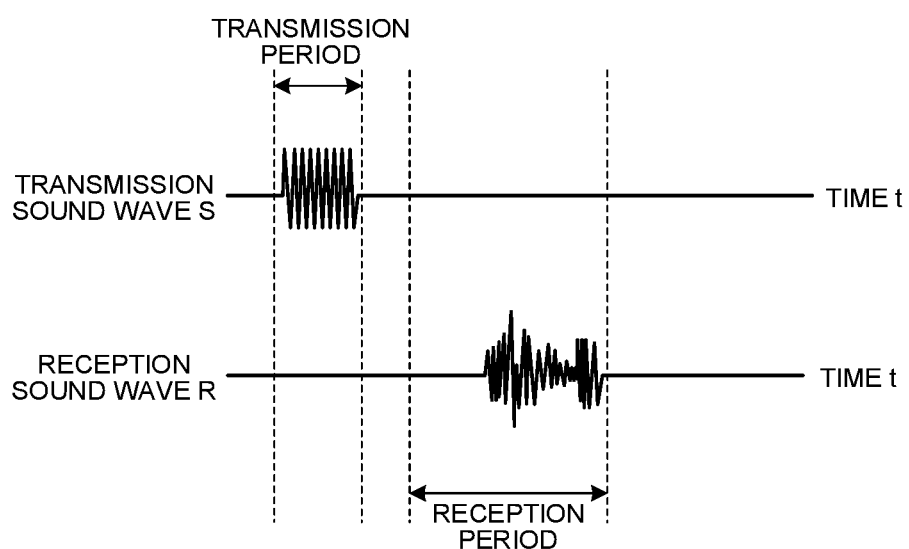
FIG. 1B is a diagram illustrating an example of a transmission sound wave and a reception sound wave of the sonar module.
Figure 1C:
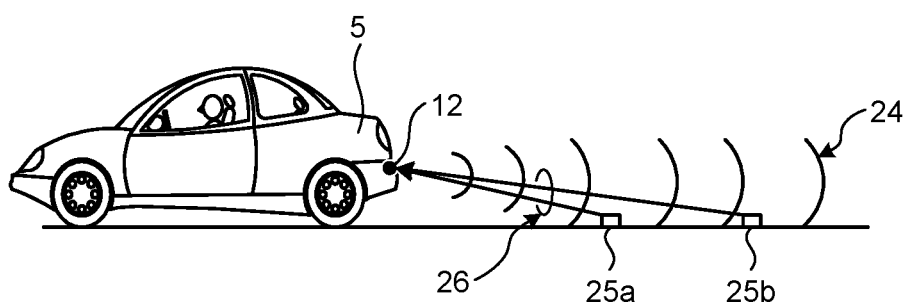
FIG. 1C is a diagram for explaining reflection of an ultrasonic wave.
Figure 1D:
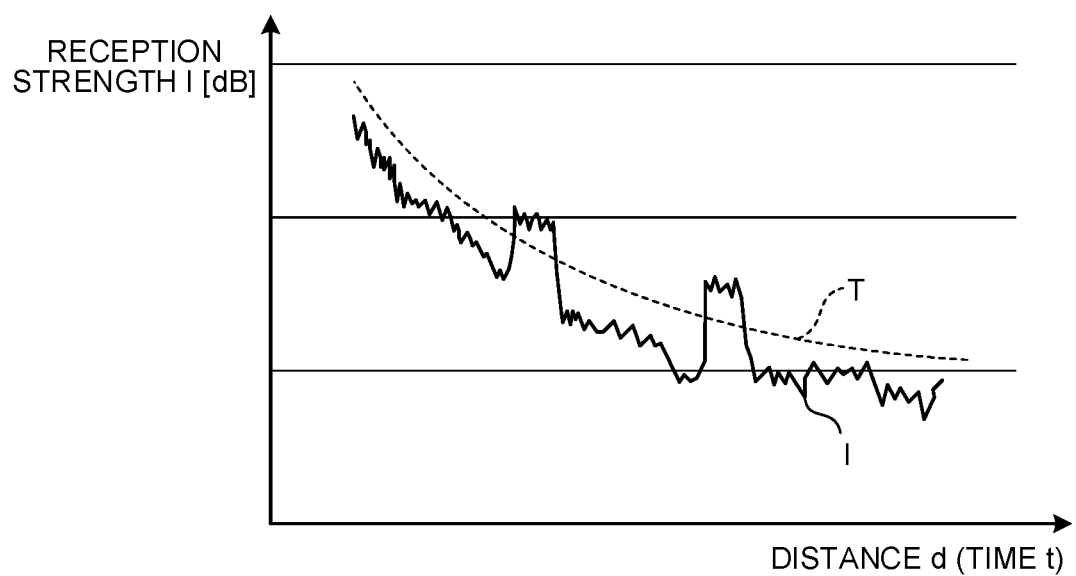
FIG. 1D is a diagram illustrating an example of a reception strength waveform.

First, the following describes a schematic configuration and an outline of operation of a sonar module 12 provided in a parking support device 10 with reference to FIG. 1A, FIG. 1B, FIG. 1C, and FIG. 1D. FIG. 1A is a block diagram illustrating the schematic configuration of the sonar module. FIG. 1B is a diagram illustrating an example of a transmission sound wave and a reception sound wave of the sonar module. FIG. 1C is a diagram for explaining reflection of an ultrasonic wave. FIG. 1D is a diagram illustrating an example of a reception strength waveform.

As illustrated in FIG. 1A, the sonar module 12 includes a piezoelectric element 19, a drive circuit 20, a reception circuit 21, and a controller 22. The controller 22 includes a timer 22a, a waveform memory 22b, a communication circuit 22c, a threshold memory 22d, and a determination circuit 22e. The controller 22 is connected to the parking support device 10 (refer to FIG. 2A) via a transmission path 23.

The sonar module 12 transmits an ultrasonic wave by applying a voltage to the piezoelectric element 19. For example, when the controller 22 controls the drive circuit 20 to apply an AC voltage of 50 KHz to the piezoelectric element 19, the piezoelectric element 19 transmits an ultrasonic wave of the same frequency. The transmitted ultrasonic wave has a pulse-like waveform the transmission period of which is managed by the timer 22a. The pulse-like ultrasonic wave is reflected when hitting a road surface or an obstacle, and part of the ultrasonic wave is returned to the sonar module 12.

The piezoelectric element 19 then converts a sound pressure of a returned reflected wave into a voltage. The reception circuit 21 includes an amplifier circuit (amplifier) (not illustrated) that amplifies the voltage converted from the sound pressure by the piezoelectric element 19. The reception circuit 21 amplifies, by the amplifier circuit, and rectifies the voltage that is converted from the sound pressure by the piezoelectric element 19, and converts it into a sound wave reception strength. A waveform (FIG. 1D) indicating a temporal change of the converted sound wave reception strength is referred to as a reception strength waveform. A reception signal and an amplified reception signal are alternating currents, and the sound wave reception strength is obtained by rectifying the amplified reception signal, so that they are both obtained by processing the reception signal although there is a difference between the alternating current and a direct current. Thus, they may be collectively referred to as reception signals without distinguish between the alternating current and the direct current. In a scene of detection, the reception sound wave in a state of being converted into the reception strength is compared with a threshold instead of a waveform of the reception sound wave. Thus, in a practical use, the waveform of the reception strength is referred to as the reception strength waveform instead of the waveform of the reception sound wave.

The sonar module 12 transmits a transmission sound wave S illustrated in FIG. 1B, for example, from the piezoelectric element 19. The sonar module 12 then receives a reception sound wave R illustrated in FIG. 1B, for example, from the piezoelectric element 19.

The transmission sound wave S is a pulse-like sound wave having a transmission period determined in advance. The transmitted sound wave then hits an obstacle, and is returned toward the sonar module to be the reception sound wave R. At this point, as the obstacle is present at a farther place, a time until the sound wave is returned becomes longer.

The reception circuit 21 sets a predetermined reception period after the drive circuit 20 transmits the ultrasonic wave, and receives a reflected wave of the sound wave in the reception period. For example, the reception circuit 21 has a function of masking a range other than the predetermined reception period. The reception period may be appropriately set in accordance with a distance to the obstacle detected by the sonar module 12.

As illustrated in FIG. 1C, the pulse-like ultrasonic wave transmitted from the sonar module 12 mounted on a vehicle 5 becomes a cone 24 of a sound wave to be released into the air. The cone 24 of the sound wave is reflected when hitting a road surface or obstacles 25a and 25b, and part of it is returned to the piezoelectric element 19. This reflected wave is an echo 26.

FIG. 1D is a diagram illustrating an example of the reception strength waveform. In FIG. 1D, a horizontal axis indicates a distance d and a time t, and a vertical axis indicates a reception strength I of a sound wave, for example, a sound wave reception strength. The sound wave reception strength may be simply referred to as a reception strength in some cases. The reception strength waveform is stored in the waveform memory 22b of the controller 22.

As the object is present at a farther place, a time from when an ultrasonic wave is transmitted from the sonar module 12 until the ultrasonic wave is returned to the sonar module 12 is prolonged, so that a time length from transmission to reception can be converted into a distance from the sonar module 12 to the object. The sonar module 12 is disposed at an end of the vehicle 5, so that the distance from the sonar module 12 to the object is substantially equal to a distance from the vehicle 5 to the object. Hereinafter, the distance from the sonar module 12 to the object may be represented as the distance from the vehicle 5 to the object in some cases.

Among objects that reflect the ultrasonic wave, an object that hinders traveling of the vehicle 5 is referred to as an obstacle, and an object that does not hinder traveling of the vehicle 5 is referred to as a non-obstacle. Examples of the non-obstacle include a small stone on a road, unevenness such as a level difference on a road surface, and a road surface itself. A threshold of the sound wave reception strength is set so that a reflected wave from such a non-obstacle is not detected. The threshold of the sound wave reception strength is also referred to as a detection threshold. The threshold of the sound wave reception strength may also be simply referred to as a threshold. The detection threshold is stored in the threshold memory 22d of the controller 22.

A reflected wave the reception strength of which is equal to or smaller than the detection threshold is excluded from a detection target as a reflected wave reflected by a non-obstacle. The ultrasonic wave is rapidly attenuated in the air, so that, as the distance from the vehicle 5 to the object is increased, a height of the reception strength waveform, for example, the reception strength of the reflected wave is lowered. Due to this, as illustrated in FIG. 1D, a detection threshold T is set to be smaller as the distance from the vehicle 5 is increased. The distance from the vehicle 5 corresponds to the time length from transmission of the ultrasonic wave to reception of the reflected wave of the ultrasonic wave, so that the detection threshold T becomes smaller as the time length from transmission of the ultrasonic wave to reception of the reflected wave of the ultrasonic wave. For example, the detection threshold T is not a single numerical value, but a plurality of values associated with different distances. On the reception strength waveform, the detection threshold T is represented as a zigzag line or a curved line.

A pulse waveform indicating the reflected wave from the obstacle on the reception strength waveform has a width, and this pulse width corresponds to a "range of difference between distances from the sonar module 12 to different portions of the obstacle", so that the shortest distance from the sonar module 12 (from the vehicle 5) to the obstacle can be calculated by converting a time until a pulse of the reception strength waveform rises into a distance. On the reception strength waveform, a waveform (a crest or a bump) indicating the reflected wave from the obstacle may be referred to as an echo waveform in some cases. For example, two echo waveforms are present in the reception strength waveform in FIG. 1D, and correspond to reflected waves (echoes) from the two obstacles 25a and 25b in FIG. 1C, respectively. Additionally, the entire reception strength waveform may be referred to as the echo waveform in some cases.

The determination circuit 22e of the controller 22 detects an object around the vehicle 5 by comparing the reception strength waveform (echo waveform) with the detection threshold T stored in the threshold memory 22d. More precisely, an amplified reception signal is rectified to be the sound wave reception strength, and the sound wave reception strength is compared with the detection threshold T. The determination circuit 22e determines that the obstacle is detected in a case in which a reflected wave having a reception strength I exceeding the detection threshold T is received, and sends out, to the communication circuit 22c, distance information indicating that the obstacle is detected and indicating the distance from the vehicle 5 to the obstacle. The communication circuit 22c transmits, to the parking support device 10 (refer to FIG. 2A), the distance information indicating that the obstacle is detected and indicating the distance from the vehicle 5 to the obstacle via the transmission path 23 such as an in-vehicle LAN.

Although FIG. 1D illustrates the reception strength waveform corresponding to one time of transmission, the sonar module 12 repeatedly transmits ultrasonic waves at predetermined time intervals managed by the timer 22a.

Schematic Configuration of Parking Support Device

Figure 2A:
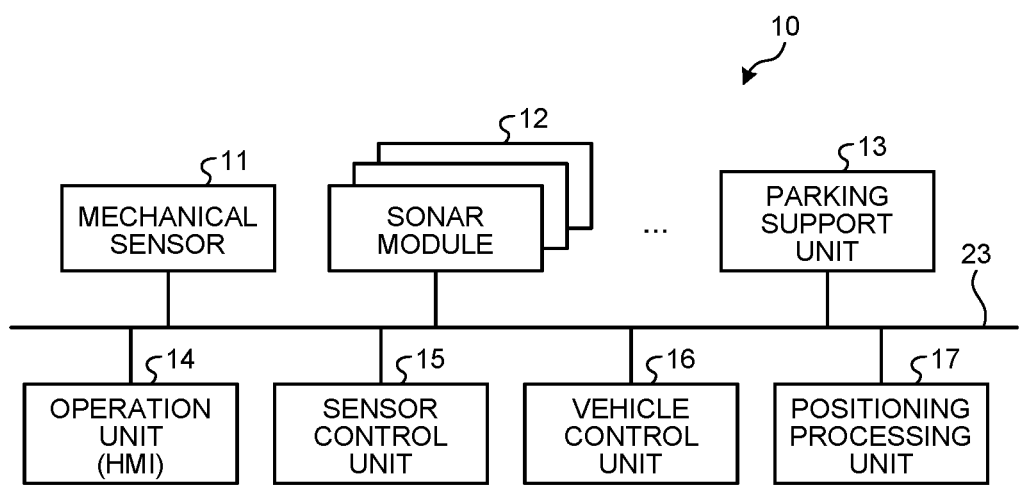
FIG. 2A is a block diagram illustrating an example of a schematic configuration of a parking support device.
Figure 2B:
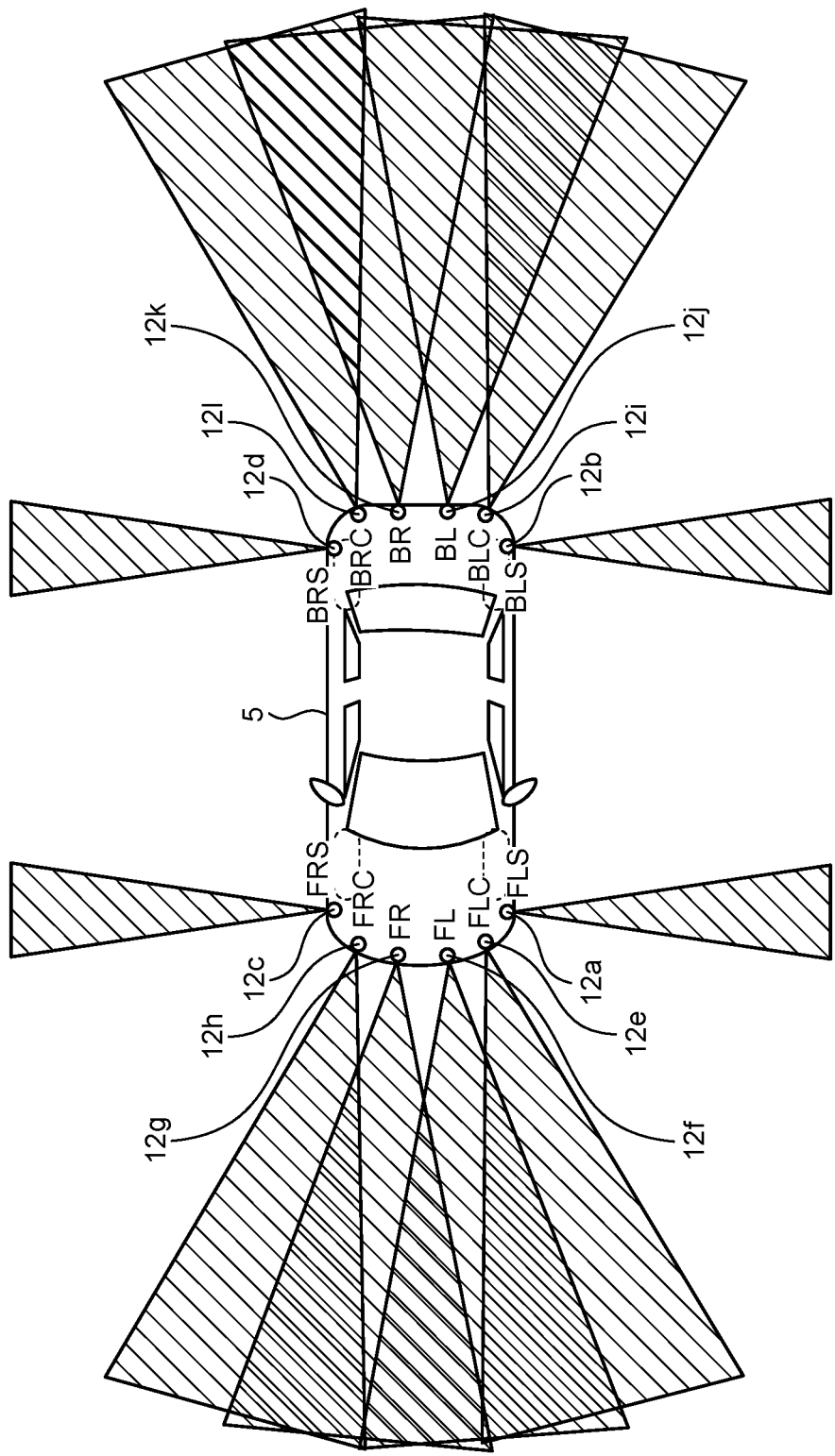
FIG. 2B is a diagram illustrating a disposition example of the sonar module disposed in a vehicle on which the parking support device is mounted.

The following describes a schematic configuration of the parking support device 10 according to the present embodiment with reference to FIG. 2A and FIG. 2B. FIG. 2A is a block diagram illustrating an example of the schematic configuration of the parking support device. FIG. 2B is a diagram illustrating a disposition example of the sonar module disposed in a vehicle on which the parking support device is mounted.

As illustrated in FIG. 2A, the parking support device 10 is provided in the vehicle 5, and includes a mechanical sensor 11, the sonar module 12, a parking support unit 13, an operation unit 14, a sensor control unit 15, a vehicle control unit 16, and a positioning processing unit 17. FIG. 2A illustrates portions related to control while omitting a vehicle body, an engine, and the like. The number of blocks illustrated in FIG. 2A does not correspond to the number of physical boxes. Functional parts illustrated in FIG. 2A are connected to each other via the transmission path 23 such as an in-vehicle LAN, for example.

The mechanical sensor 11 includes a sensor that measures a steering angle, a gear position, a vehicle speed, the number of revolutions of a wheel, and the like of the vehicle 5.

A plurality of (for example, twelve) the sonar modules 12 are provided in the vehicle 5. Details will be described later (refer to FIG. 2B). The sonar module 12 may be directly connected to the vehicle control unit 16 via dedicated wiring.

The parking support unit 13 sets a target position of automatic parking, a route to the target position, and a parking direction at the target position by using detection information obtained by the sonar module 12, and corrects the parking direction in accordance with detection information that is added during automatic parking.

The operation unit 14 includes input/output devices such as a display, a touch panel, a switch, and a speaker. At the time of performing automatic parking, the operation unit 14 receives an operation instruction from a driver. The operation unit 14 also transmits progress of automatic parking operation to the driver.

The sensor control unit 15 acquires own vehicle position information on the vehicle 5 detected by the positioning processing unit 17. When detecting that the vehicle 5 is present in a parking lot, the sensor control unit 15 processes the data acquired by the sonar module 12 to obtain the detection information. Specifically, coordinates of a detection point at which a position of the obstacle is specified based on a principle of triangulation and distances from a plurality of the sonar modules, and a plurality of the detection points are divided into detection point groups based on distribution of the detection points and continuity of coordinates. Pieces of information on the detection points or the detection point groups are collectively referred to as the detection information. The sensor control unit 15 also calculates a likelihood indicating the likelihood that the detection point group is estimated to be a structure by analyzing the detection information. In the embodiment, it may be represented as a likelihood of the obstacle and it may be represented as a likelihood of the detection point group.

However, an obstacle in the real world is processed as a detection point group inside the sensor control unit 15, so that there is no difference between the likelihood of the obstacle and the likelihood of the detection point group in view of processing. The sensor control unit 15 also perform transmission control for the sonar module 12.

The vehicle control unit 16 performs steering angle control and speed control for the vehicle 5 for automatic parking. The vehicle control unit 16 assists steering of a power steering device of the vehicle 5. The vehicle control unit 16 also controls an engine as a driving source of the vehicle 5, a motor, and a brake.

The positioning processing unit 17 outputs the own vehicle position information on the vehicle 5 based on the number of revolutions of the wheel output from the mechanical sensor 11, and outputs from a GPS navigation system and the like.

The blocks illustrated in FIG. 2A are connected via an in-vehicle LAN 18, and commands and data are transmitted or received via the in-vehicle LAN 18. For example, the parking support unit 13 determines whether the vehicle 5 is present on a road or present in a parking lot based on the own vehicle position information obtained from the positioning processing unit 17 via the in-vehicle LAN 18. At the time of automatic parking, the vehicle control unit 16 controls the vehicle body based on a command from the parking support unit 13.

As illustrated in FIG. 2B, the twelve sonar modules 12 are disposed in the vehicle 5. For example, on a left side of the vehicle 5, a sonar module 12a is disposed on a front side (Front Left Side: FLS) of the vehicle 5, and a sonar module 12b is disposed on a back side (Back Left Side: BLS) of the vehicle 5. Four sonar modules are provided therein. On a right side of the vehicle 5, a sonar module 12c is disposed on a front side (Front Right Side: FRS) of the vehicle 5, and a sonar module 12d is disposed on a back side of the vehicle 5 (Back Right Side: BRS). These four sonar modules detect an obstacle to a side of the vehicle, so that they are also referred to as side sonar.

On a front side of the vehicle 5, a sonar module 12e (Front Left Corner: FLC), a sonar module 12f (Front Left: FL), a sonar module 12g (Front Right: FR), and a sonar module 12h (Front Right Corner: FRC) are disposed in this order from the left side in a forward movement direction of the vehicle 5. The sonar module 12f and the sonar module 12g provided inside detect an obstacle in a traveling direction at the time when the vehicle 5 moves straight forward. The sonar module 12e and the sonar module 12h provided outside detect an obstacle in a turning direction at the time when the vehicle 5 turns. The sonar modules 12e and 12h are also referred to as corner sonar. The four sonar modules 12e, 12f, 12g, and 12h are disposed so that detection ranges thereof overlap with each other.

On the back side of the vehicle 5, a sonar module 12i (Back Left Corner: BLC), a sonar module 12j (Back Left: BL), a sonar module 12k (Back Right: BR), and a sonar module 12l (Back Right Corner: BRC) are disposed in this order from the left side in a forward movement direction of the vehicle 5. The sonar module 12j and the sonar module 12k provided inside detect an obstacle in the traveling direction at the time when the vehicle 5 moves backward. The sonar module 12i and the sonar module 12l provided outside detect an obstacle in a turning direction at the time when the vehicle 5 moves backward and turns. The sonar modules 12i and 12l are also referred to as corner sonar. The four sonar modules 12i, 12j, 12k, and 12l are disposed so that detection ranges thereof overlap with each other.

The detection ranges of the sonar modules 12a, 12b, 12c, and 12d disposed to the side of the vehicle 5 are set to be narrower than the detection ranges of the sonar modules disposed to the front of and to the back of the vehicle 5. This setting is made for improving detection resolution at the time when the parking support device 10 detects a parking space to the side of the vehicle 5 by minimizing overlapping of the detection ranges of the side sonar at the time when the vehicle 5 moves. Each of the sonar modules are disposed at a height and a depression angle with which an obstacle in the periphery can be easily detected at the time when the vehicle 5 performs parking.

Method for Specifying Coordinates of Detection Point

Figure 3:
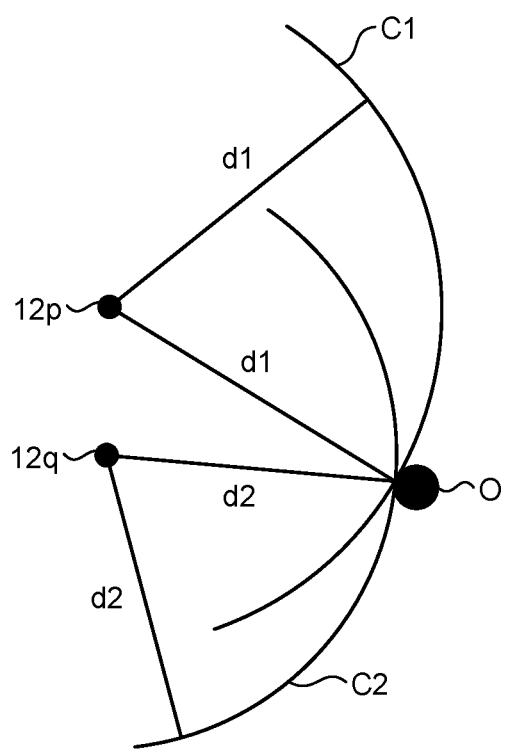
FIG. 3 is a diagram for explaining a method for specifying a distance to an object.

The following describes a method for specifying coordinates of the detection point based on a signal detected by the sonar module 12 with reference to FIG. 3 FIG. 3 is a diagram for explaining a method for specifying a distance to the object.

In a case in which sonar 12p illustrated in FIG. 3 transmits a sound wave, and a reflected wave from an object O that is distant from the sonar 12p by a distance d1 is detected after a time T1, a path length of the sound wave is 2d1. Thus, it is assumed that the time has elapsed by T1 while the sound wave travels at a sonic speed M by the distance 2d1. Accordingly, the one-way distance d1 from the sonar 12p to the object O can be calculated by an expression (1).

$$d1 = T1 \times M \div 2 \quad (1)$$

Assuming that sonar 12q detects the reflected wave from the object O after a time T2 has elapsed after transmission is performed by the sonar 12p, a path length from the sonar 12q to the sonar 12q via the object O is d1+d2, so that a one-way distance d2 from the sonar 12q to the object O can be calculated by an expression (2).

$$d2 = T2 \times M - d1 \quad (2)$$

Positions of the sonar 12p and the sonar 12q are known, so that the coordinates of the object O can be specified as coordinates of an intersection point of an arc C1 of the distance d1 (radius) centered on the sonar 12p and an arc C2 of a distance d2 (radius) centered on the sonar 12q.

Outline of Operation of Parking Support Device

Figure 4:
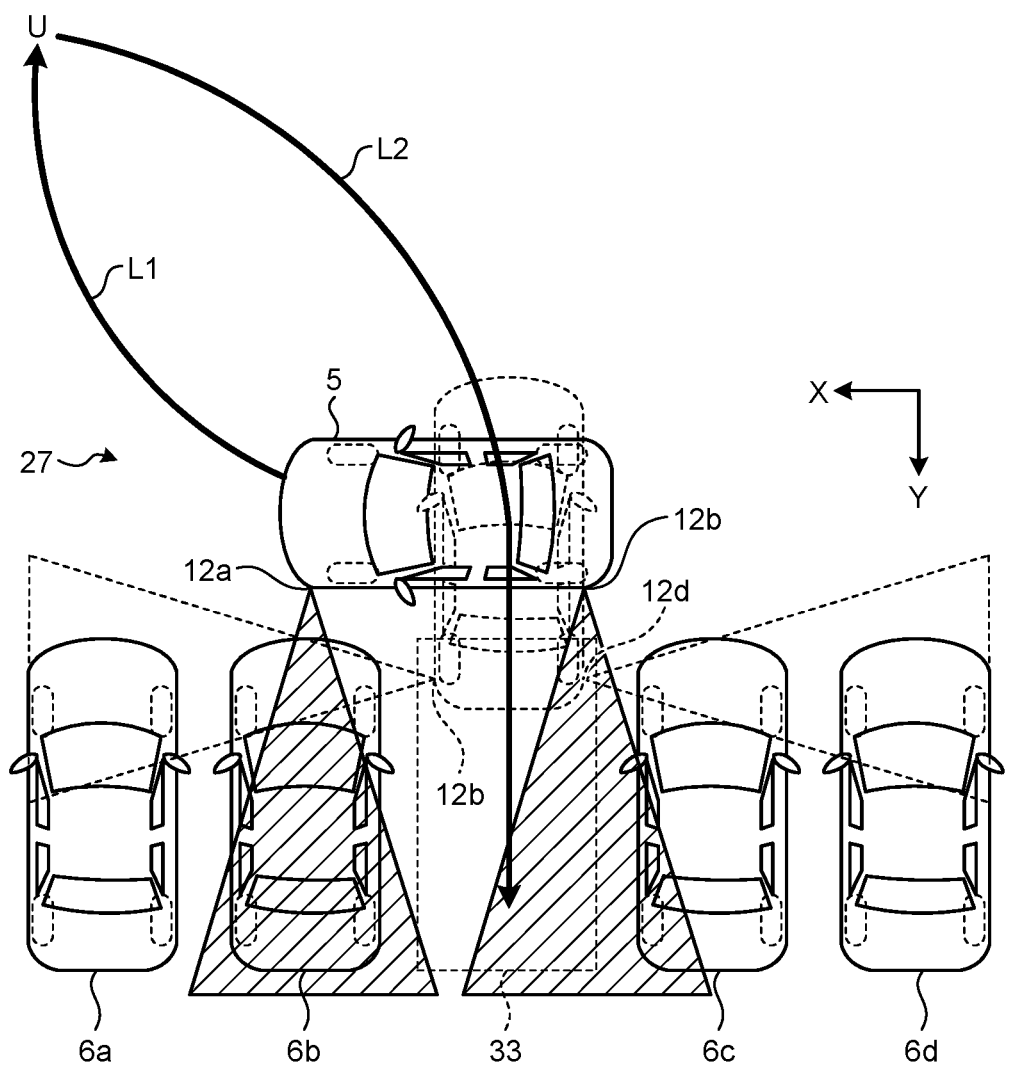
FIG. 4 is a diagram for explaining an outline of operation of the parking support device.

The following describes an outline of an operation of the parking support device 10 according to the present embodiment with reference to FIG. 4. FIG. 4 is a diagram for explaining an outline of an operation of the parking support device.

The vehicle 5 on which the parking support device 10 is mounted moves forward along a passage 27 in a parking lot, and searches for a space in which the vehicle 5 can be parked. Herein, it is assumed that a space allowing parking is detected to a left of the vehicle 5 in the traveling direction, and a target parking position 33 is set in this space.

The vehicle 5 moves forward along the passage 27, and performs range finding using the side sonar (sonar modules 12a and 12b). Under the condition that the space in which the vehicle 5 can be parked is found based on a distribution state of the detection points obtained as a result of range finding, the parking support device 10 sets the target parking position 33 in this space.

For example, in the example of FIG. 4, a space in which the vehicle 5 can be parked is found between a parked vehicle 6b and a parked vehicle 6c. For example, it is assumed that a space is found between the parked vehicle 6b and the parked vehicle 6c, the space having a width along the traveling direction of the vehicle 5 wider than a vehicle width of the vehicle 5, and having a length longer than a total length of the vehicle 5 in a direction orthogonal to the traveling direction of the vehicle 5. Within a range of this space, for example, the target parking position 33 may be set to be parallel to the parked vehicle 6b and the parked vehicle 6c at the center between the parked vehicle 6b and the parked vehicle 6c.

After setting the target parking position 33, the parking support device 10 sets a parking route starting from a current position to park the vehicle 5 side by side at the target parking position 33. In the example of FIG. 4, the parking support device 10 sets a parking route L1 and a parking route L2. For example, the parking support device 10 sets the parking route L1 for moving forward from the current position by steering to the right to reach a turnaround point U, and the parking route L2 for switching a shift position to a reverse (R) position at the turnaround point U to move backward toward the target parking position 33.

At the time when the vehicle 5 travels along the parking route L2, the parking support device 10 performs range finding for the side of the vehicle 5 by the sonar modules 12b and 12d. The parking support device 10 then corrects a steering angle so that the vehicle 5 does not come into contact with the obstacle in accordance with positions of the detected detection points, and causes the vehicle 5 to move backward toward the target parking position 33.

The parking support device 10 according to the present embodiment performs two processing steps including a first step and a second step. The first step is a step of traveling along the passage 27 of the parking lot, acquiring the detection points indicating positions of obstacles around the vehicle 5 by the sonar modules 12, and setting the target parking position 33 based on arrangement of the acquired detection points. The second step is a step of setting the parking routes L1 and L2 from the current position to the target parking position 33, correcting a steering angle along the set parking routes L1 and L2, and causing the vehicle 5 to move backward to the target parking position 33. The following describes content of processing performed at the first step and the second step in detail.

Explanation of Terms Used in Description of Embodiments

Figure 5A:
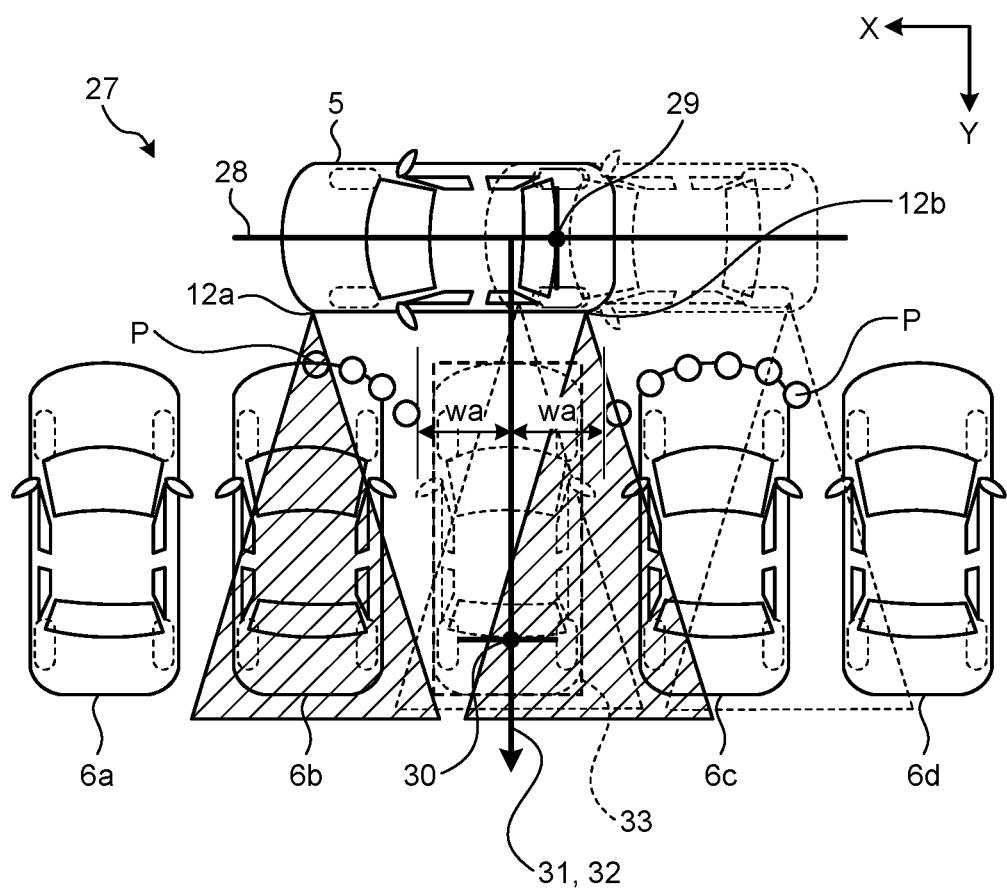
FIG. 5A is a first diagram for explaining various parameters that are acquired or set by the parking support device before performing automatic parking.
Figure 5B:
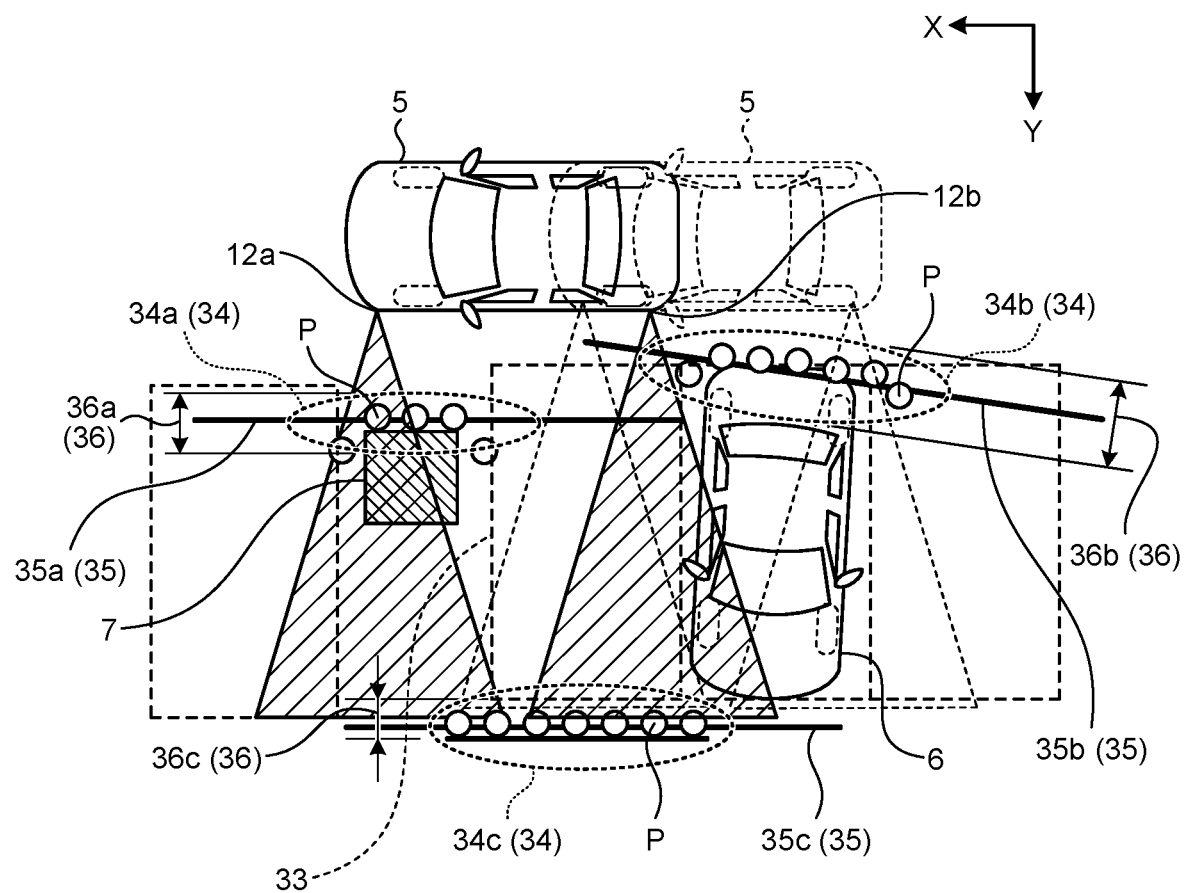
FIG. 5B is a second diagram for explaining various parameters that are acquired or set by the parking support device before performing automatic parking.
Figure 5C:
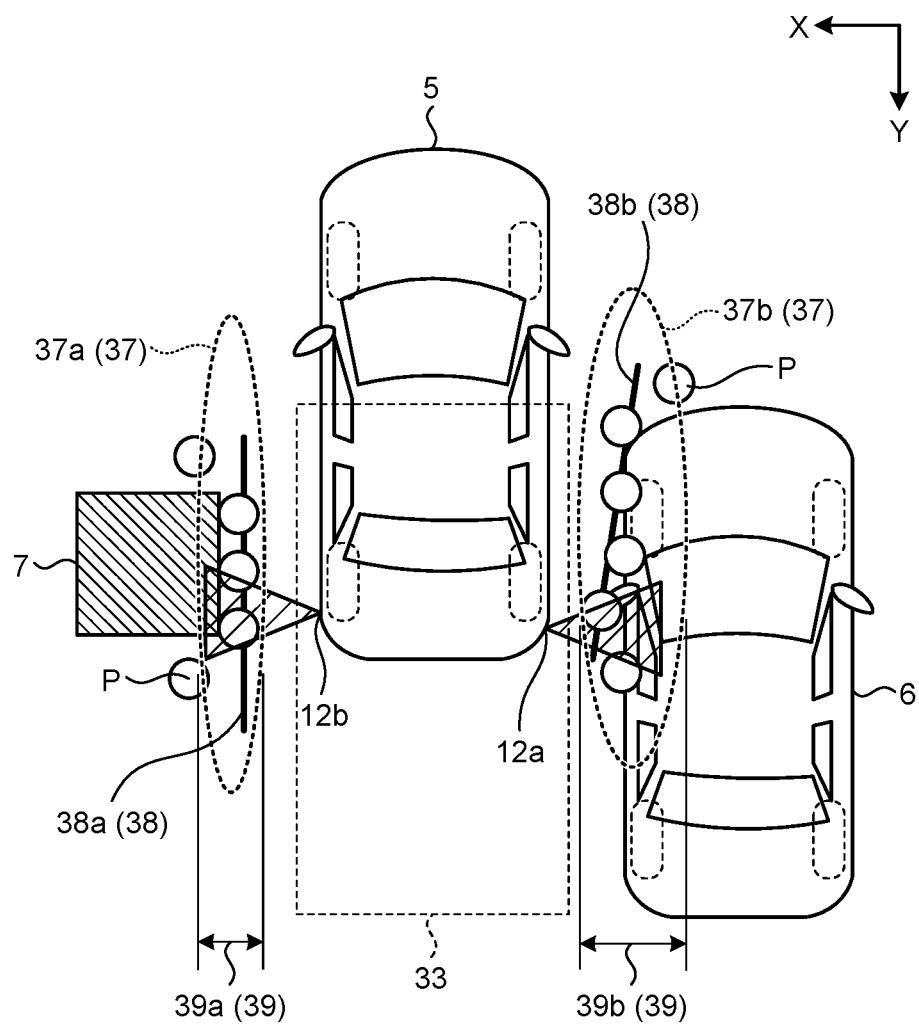
FIG. 5C is a diagram for explaining various parameters that are acquired or set by the parking support device before performing automatic parking.

Next, the following explains terms used for explaining specific content of the processing performed by the parking support device 10 with reference to FIG. 5A, FIG. 5B, and FIG. 5C.

First, with reference to FIG. 5A and FIG. 5B, the following describes various parameters that are used until the parking support device 10 sets the target parking position 33, for example, at the first step described above.

The target parking position 33 set by the parking support device 10 is determined based on a parking point 30, a center line 31 of the target parking position, a parking direction 32, and a size (a total length and a vehicle width) of the vehicle 5 illustrated in FIG. 5A.

A representative point representing the position of the vehicle is a position of a middle point between two back wheels of the vehicle. The parking routes L1 and L2 (refer to FIG. 4) are defined as routes along which the representative point moves. The parking point 30 is an ending point of the parking route that the representative point reaches at the time when parking is completed. The center line 31 of the target parking position is a straight line indicating a longitudinal axis of the vehicle body passing through the parking point 30, and the parking direction 32 indicates a direction along which the vehicle travels toward the parking point 30. The present embodiment describes an example of backward parking, so that the parking direction 32 is a direction toward the back of the vehicle body. However, in a case of forward parking, the parking direction is a direction toward the front of the vehicle body.

Definitions of the representative point of the vehicle and the parking route in the present embodiment are merely examples, and may be optionally determined. For example, the representative point of the vehicle may be assumed to be an intersecting point of diagonal lines of a rectangle the vertices of which are points at which four wheels are grounded, and a moving route of the representative point of the vehicle may be defined as the parking route.

A standard of an angle of the parking direction 32 may be optionally determined. In the present embodiment, assuming that a longitudinal axis 28 of the vehicle 5 at the time when the target parking position 33 is determined is the standard of the angle (the front of the vehicle 5 is 0°), the angle of the parking direction 32 is an angle formed by the longitudinal axis 28 and the center line 31 of the target parking position. Alternatively, the parking direction 32 may be determined assuming that the axis of the earth is the standard of the angle (true north is 0°).

The parking support device 10 sets the target parking position 33 by taking into account the size (the total length and the vehicle width) of the vehicle 5 in addition to the set parking point 30, the center line 31 of the target parking position, and the parking direction 32.

The parking support device 10 relatively determines the position by using, as an origin, a middle point 29 between the two back wheels of the vehicle 5 at the time when the target parking position 33 is determined, but the position may be absolutely determined with latitude and longitude.

At the time of setting the parking point 30, the center line 31 of the target parking position, and the parking direction 32, the parking support device 10 uses coordinates of a plurality of detection points P detected by the sonar modules 12a and 12b.

In the example of FIG. 5A, in a state in which parked vehicles 6a, 6b, 6c, and 6d are parked, the vehicle 5 travels along the passage 27 at a constant speed while performing range finding by the sonar modules 12a and 12b, and the parking support device 10 detects that there is a section in which the detected detection points P are interrupted. If the length of the section in which the detection points P are interrupted is larger than the vehicle width of the vehicle 5, the parking support device 10 determines that a space in which the vehicle 5 can be parked is detected. The parking support device 10 determines the center line 31 of the target parking position at a position passing through the space allowing parking, and having equal distances (wa) to the left and the right detection points P. The left and the right correspond to directions in which left and right hands of an occupant are present at the time when the vehicle is parked at the target parking position 33. In the example of FIG. 5A, the parked vehicle 6b is present to the left, and the parked vehicle 6c is present to the right.

Next, with reference to FIG. 5B, the following describes parameters calculated by the parking support device 10 for setting the parking direction 32 based on the coordinates of the detection points P detected by the sonar modules 12a and 12b.

The detection points P detected by the sonar modules 12a and 12b are detected in the vicinity of an outer peripheral edge facing the vehicle 5 of an obstacle present around the vehicle 5. Thus, the detection points P form different groups for respective obstacles. For example, in the example of FIG. 5B, formed are a detection point group 34a detected in the vicinity of an outer peripheral edge facing the vehicle 5 of a rectangular column 7, a detection point group 34b detected in the vicinity of an outer peripheral edge facing the vehicle 5 of a parked vehicle 6, and a detection point group 34c detected in the vicinity of a wall surface at the back of the parking space or a car stop. The detection points P detected at the first step are referred to as first detection points P, and a detection point group constituted of the first detection points P is referred to as a first detection point group. Hereinafter, when simply representing the first detection point group without distinguishing among the detection point groups 34a, 34b, and 34c, they are referred to as detection point groups 34 or first detection point groups 34.

For each of the detection point groups 34, the parking support device 10 applies an approximate straight line 35 to the detection points P constituting the detection point group 34. For example, an approximate straight line 35a is applied to the detection point group 34a in FIG. 5B. An approximate straight line 35b is applied to the detection point group 34b. An approximate straight line 35c is applied to the detection point group 34c. Hereinafter, when representing a typical approximate straight line without distinguishing among the approximate straight lines 35a, 35b, and 35c, they are simply referred to as approximate straight lines 35. A method for applying the approximate straight line 35 to the detection point group 34 is not particularly limited. For example, the approximate straight line 35 may be applied by approximating coordinates (X, Y) of each of the detection points P constituting the detection point group 34 by least squares. The approximate straight line 35 applied to the first detection point group is referred to as a first approximate straight line 35.

The parking support device 10 also calculates a variation 36 of the detection points P with respect to the approximate straight line 35 for each of the detection point groups 34. For example, for the detection point group 34a, a variation 36a of the detection points P around the approximate straight line 35a is calculated. For the detection point group 34b, a variation 36b of the detection points P around the approximate straight line 35b is calculated. Furthermore, for the detection point group 34c, a variation 36c of the detection points P around the approximate straight line 35c is calculated. Hereinafter, when representing a typical variation without distinguishing among the variations 36a, 36b, and 36c, they are simply referred to as variations 36. The variation 36 represents a likelihood that the approximate straight line 35 is a straight line. For example, as the variation 36 is smaller, the likelihood that the approximate straight line 35 is a straight line is higher. Conversely, as the variation 36 is larger, the likelihood that the approximate straight line 35 is a straight line is lower. The variation 36 of the detection points P around the approximate straight line 35 is referred to as a first variation 36.

A method for calculating the variation 36 is not particularly limited. For example, the variation 36 may be a mean square error between the approximate straight line 35 and each of the detection points P, or the variation 36 may be a correlation coefficient or variance (covariance). Alternatively, assuming that the variation 36 is an inverse number of a length of a straight line section in which the detection points P are arranged along the approximate straight line 35, the variation 36 may be assumed to be smaller as the straight line section in which the detection points P are arranged along the approximate straight line 35 is longer.

The parking support device 10 sets the parking direction 32 of the vehicle 5 based on orientation of the approximate straight line 35 and magnitude of the variation 36 of the detection points P calculated as described above. Details will be described later.

Next, with reference to FIG. 5C, the following describes various parameters that are used at the time when the parking support device 10 corrects, after setting the target parking position 33 and the parking route from the current position to the target parking position 33, the steering angle along the set parking route and causes the vehicle 5 to move backward, for example, at the second step described above.

At the second step, the vehicle 5 moves backward between left and the right obstacles. In the example of FIG. 5C, the vehicle 5 moves backward between the rectangular column 7 and the parked vehicle 6.

At this point, the detection points P are detected by the sonar modules 12b and 12d in the vicinity of outer peripheral edges facing the vehicle 5 of the obstacles present around the vehicle 5. Thus, the detection points P form different groups for respective obstacles. In the example of FIG. 5C, formed are a detection point group 37a detected in the vicinity of an outer peripheral edge facing the vehicle 5 of the rectangular column 7, and a detection point group 37b detected in the vicinity of an outer peripheral edge facing the vehicle 5 of the parked vehicle 6. The detection points P detected at the second step are referred to as second detection points P, and a detection point group constituted of the second detection points P is referred to as a second detection point group. In a case in which second detection point groups are respectively detected to the left and the right of the vehicle 5, the detection point group to one side is referred to as a first detection point small group, and the detection point group to the other side is referred to as a second detection point small group. For example, in a case of FIG. 5C, the detection point group 37a is the first detection point small group, and the detection point group 37b is the second detection point small group. Hereinafter, when simply representing the second detection point group without distinguishing between the detection point groups 37a and 37b, they are referred to as detection point groups 37 or second detection point groups 37.

For each of the detection point groups 37, the parking support device 10 applies an approximate straight line 38 to the detection points P constituting the detection point group 37. For example, an approximate straight line 38a is applied to the detection point group 37a (first detection point small group) in FIG. 5C. An approximate straight line 38b is applied to the detection point group 37b (second detection point small group). Hereinafter, when representing a typical approximate straight line without distinguishing between the approximate straight lines 38a and 38b, they are simply referred to as approximate straight lines 38. The approximate straight line 38 applied to the second detection point group is referred to as a second approximate straight line 38.

The parking support device 10 also calculates a variation 39 of the detection points P with respect to the approximate straight line 38 for each of the detection point groups 37. For example, for the detection point group 37a (first detection point small group), a variation 39a of the detection points P around the approximate straight line 38a is calculated. For the detection point group 37b (second detection point small group), a variation 39b of the detection points P around the approximate straight line 38b is calculated. Hereinafter, when representing a typical variation without distinguishing between the variations 39a and 39b, they are simply referred to as variations 39. The variation 39 represents a likelihood that the approximate straight line 38 is a straight line. For example, as the variation 39 is smaller, the likelihood that the approximate straight line 38 is a straight line is higher. Conversely, as the variation 39 is larger, the likelihood that the approximate straight line 38 is a straight line is lower.

The variation 39 of the detection points P around the approximate straight line 38 is referred to as a second variation 39.

The parking support device 10 corrects the parking direction 32 set at the first step based on orientation of the approximate straight line 38 and magnitude of the variation 39 of the detection points P calculated as described above. When the parking direction 32 is corrected, a correction amount thereof is reflected in a steering angle, and a vehicle body attitude is changed. Correction of the parking direction 32 will be described later in detail.

Method for Estimating Likelihood of Structure

Figure 6A:
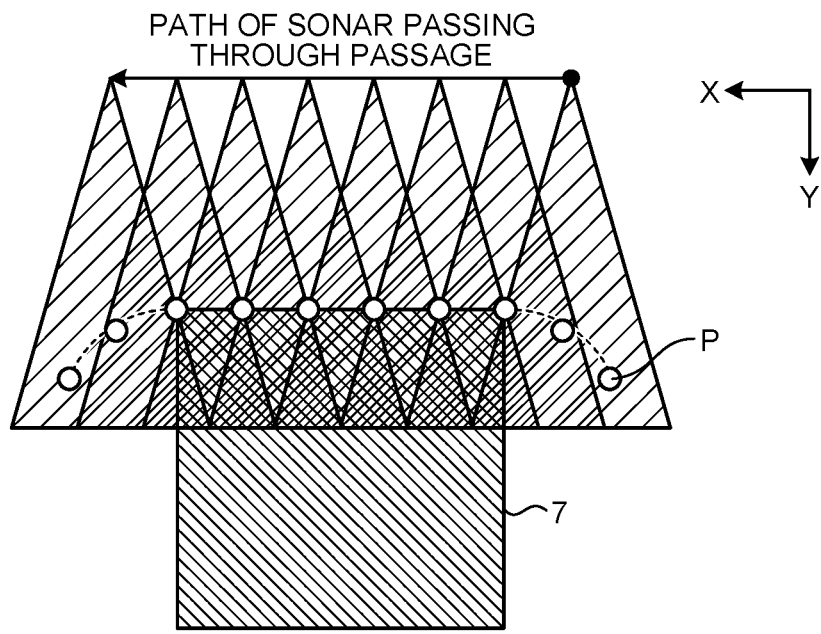
FIG. 6A is a first diagram illustrating an example in which detection points are detected bulging as compared with an actual object at an end of the object.
Figure 6B:
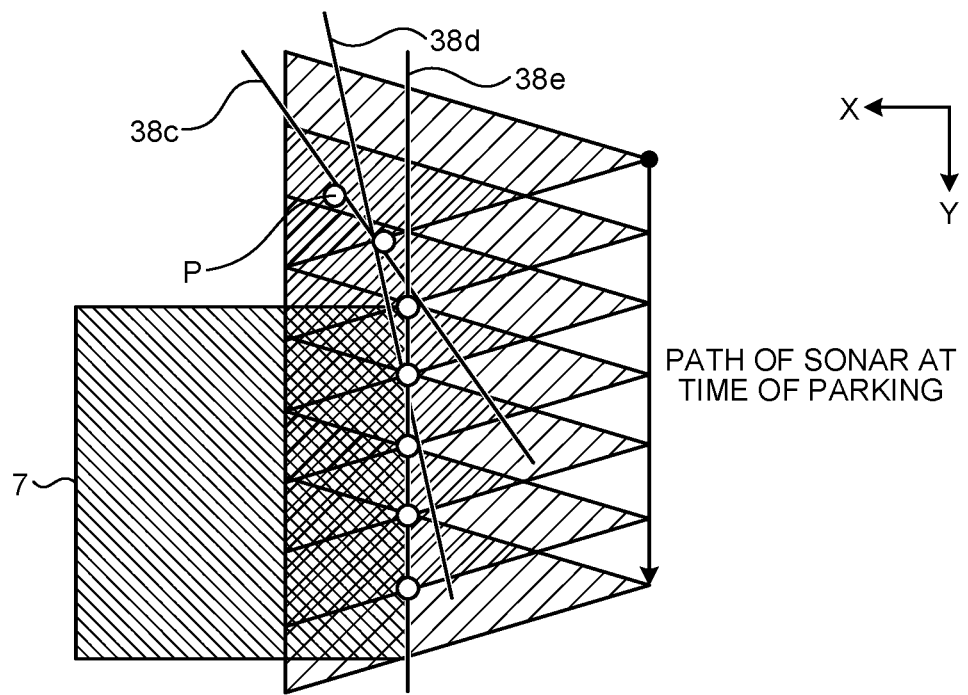
FIG. 6B is a first diagram illustrating an example in which detection points are detected bulging as compared with an actual object at an end of the object.
Figure 7A:
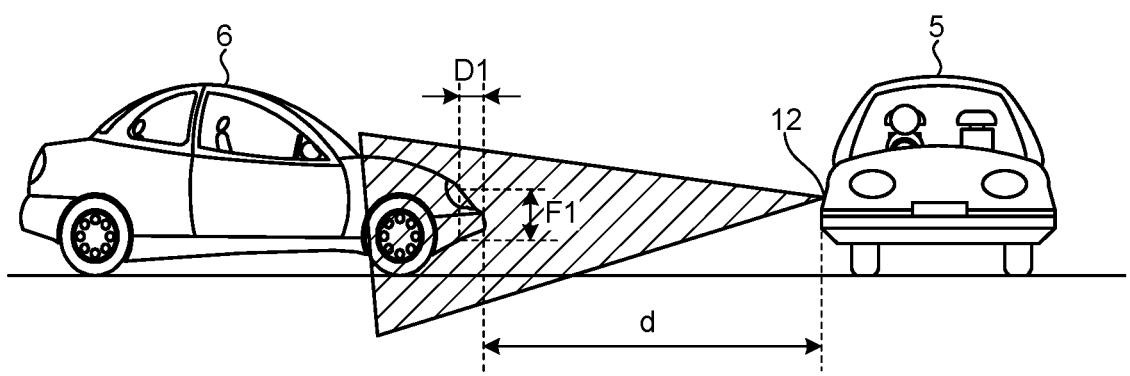
FIG. 7A is a diagram illustrating a situation in which the sonar module performs range finding for a parked vehicle.
Figure 7B:
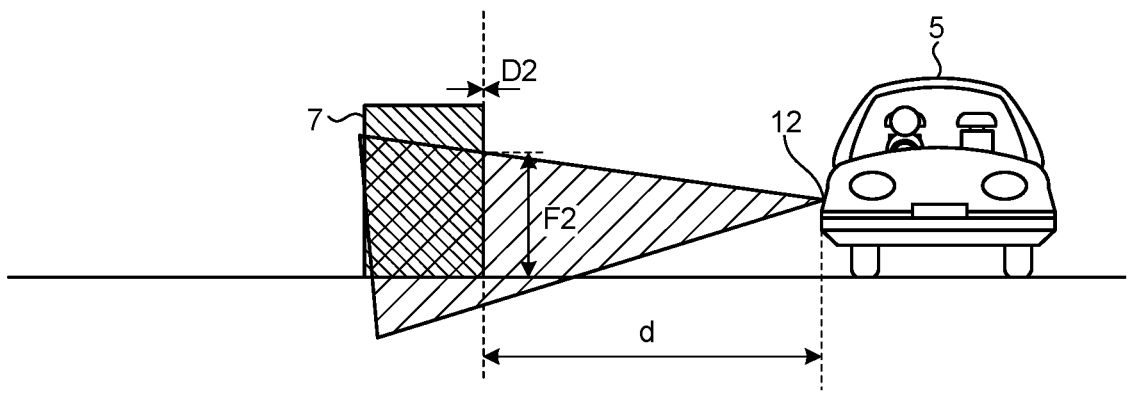
FIG. 7B is a diagram illustrating a situation in which the sonar module performs range finding for a structure (rectangular column)
Figure 7C:
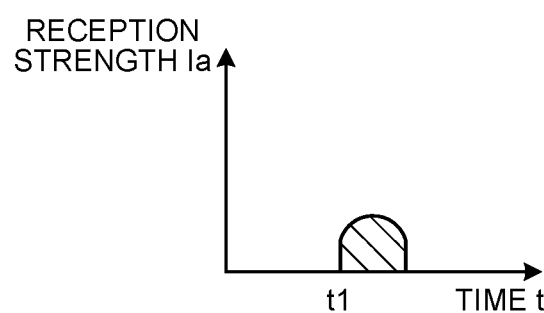
FIG. 7C is a diagram illustrating an example of a reception strength waveform of the sonar module in FIG. 7A.
Figure 7D:
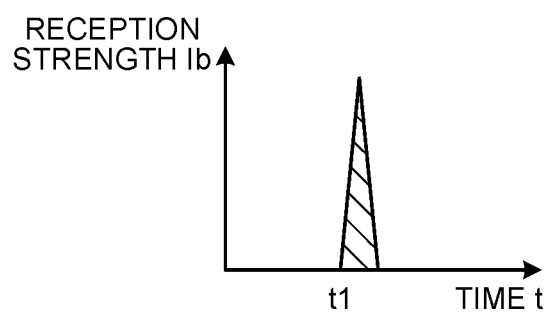
FIG. 7D is a diagram illustrating an example of a reception strength waveform of the sonar module in FIG. 7B.
Figure 8:
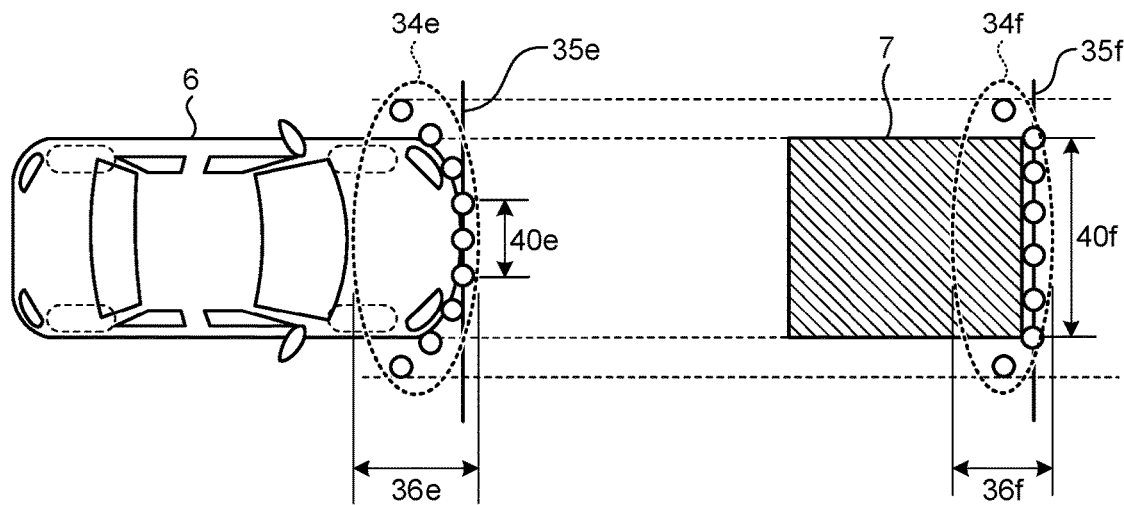
FIG. 8 is a diagram for explaining a method for discriminating between the structure (rectangular column) and the parked vehicle based on a ratio of a straight line section occupying a detection point group.
Figure 9:
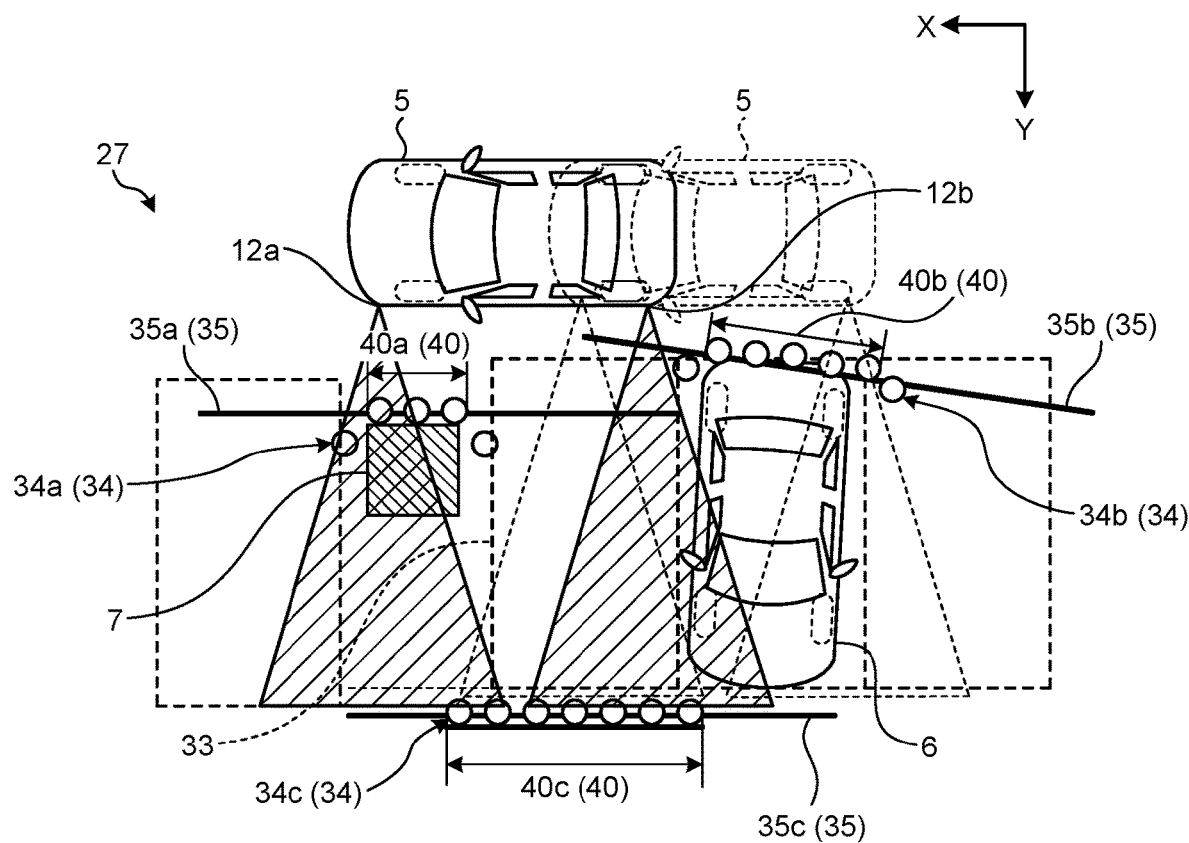
FIG. 9 is a diagram for explaining a method for discriminating between the structure (rectangular column) and the parked vehicle based on a length of the straight line section of the detection point group.

Next, the following describes a method for determining whether the detected detection point group is generated from a structure (for example, part of a building of the parking lot such as a rectangular column or a wall surface) or a parked vehicle with reference to FIG. 6A, FIG. 6B, FIG. 7A to FIG. 7D, FIG. 8, and FIG. 9. FIG. 6A is a first diagram illustrating an example in which the detection points are detected bulging as compared with an actual object at an end of the object. FIG. 6B is a second diagram illustrating an example in which the detection points are detected bulging as compared with the actual object at the end of the object. FIG. 7A is a diagram illustrating a situation in which the sonar module performs range finding for the parked vehicle. FIG. 7B is a diagram illustrating a situation in which the sonar module performs range finding for the structure (for example, a rectangular column or a wall surface). FIG. 7C is a diagram illustrating an example of a reception strength waveform of the sonar module in FIG. 7A. FIG. 7D is a diagram illustrating an example of the reception strength waveform of the sonar module in FIG. 7B. FIG. 8 is a diagram for explaining a method for discriminating between the structure (for example, a rectangular column) and the parked vehicle based on a ratio of a straight line section occupying the detection point group. FIG. 9 is a diagram for explaining a method for discriminating between the structure (for example, a rectangular column) and the parked vehicle based on a length of the straight line section of the detection point group.

The sonar module detects a distance to a point nearest to the sonar module on a surface of the object that ultrasonic waves reach. Thus, as illustrated in FIG. 6A, when the sonar module passes through the front of the rectangular column 7 along the X-axis, and the rectangular column 7 is facing the sonar module, a distance along a perpendicular from a path of the sonar to the surface of the rectangular column 7 is detected. However, at a position obliquely shifted from the rectangular column 7, an oblique distance from the sonar to a corner of the rectangular column 7 is detected. Thus, the detection point group obtained by detecting the rectangular column 7 is distributed while bulging in a lateral direction as compared with the actual rectangular column 7.

As illustrated in FIG. 6B, the same thing happens at the time when the vehicle moves backward along the Y-axis to be parked next to the rectangular column 7, and when the sonar module detects a side surface of the rectangular column 7. For example, when the sonar module faces the side surface of the rectangular column 7, the detection point group is distributed along an approximate straight line 38e. On the other hand, the detection point group detected at positions slightly deviated from the side surface of the rectangular column 7 is distributed to bulge in a lateral direction as compared with the actual rectangular column 7, so that, when the sonar module 12 is positioned in front of the corner of the rectangular column 7, the detection point group is distributed along an approximate straight line 38c or an approximate straight line 38d.

For example, at an initial stage when the vehicle starts to approach the rectangular column 7, the detection points are present at portions bulging from the actual rectangular column 7, so that an angle of the approximate straight line 38c or the approximate straight line 38d does not reflect an angle of the side surface of the actual rectangular column 7. Thus, if the angle of the side surface of the rectangular column 7 is estimated from the detection points at the initial stage and reflected in vehicle body control, unsteadiness of the vehicle body is caused.

Next, with reference to FIG. 7A to FIG. 7D, the following describes a method for discriminating between the structure (rectangular column) and the parked vehicle based on the reception strength waveform of the sonar module 12.

Reflection surfaces that reflect sound waves are compared between a case in which the sound wave of the sonar hits a front part of the parked vehicle 6 and a case in which the sound wave hits the rectangular column 7 at the same distance. As illustrated in FIG. 7A, a reflection surface F1 of the parked vehicle 6 is mainly a portion around headlights of the parked vehicle 6 facing a direction of the sonar module 12. For example, angles of a hood and a windshield are small with respect to a direction in which the sound wave comes from the sonar module 12, so that the reflected wave is not returned in the direction of the sonar module 12 of the vehicle 5. Thus, the hood and the windshield are not effectively included in the reflection surface F1. As illustrated in FIG. 7B, a reflection surface F2 of the rectangular column 7 faces the direction of the sonar module 12 of the parked vehicle 6, so that the area of the reflection surface F2 is larger than that of the reflection surface F1 in FIG. 7A. For example, as illustrated in FIG. 7A and FIG. 7B, in a case in which the distance d from the sonar module 12 to the parked vehicle 6 is equal to the distance d from the sonar module 12 to the rectangular column 7, reception strengths Ia and Ib rise at the same time t1 as illustrated in FIG. 7C and FIG. 7D. The reflection surface F1 of the parked vehicle 6 is smaller than the reflection surface F2 of the rectangular column 7, so that the reception strength Ib of the reflected wave from the rectangular column 7 illustrated in FIG. 7D is stronger than the reception strength Ia of the reflected wave from the parked vehicle 6 illustrated in FIG. 7C.

As illustrated in FIG. 7A, a depth (unevenness) D1 of the front part of the parked vehicle 6 is larger than a depth D2 of the side surface of the rectangular column 7 in FIG. 7B. In FIG. 7C, distances from the reflective surface 1 to the sonar module 12 are different among portions, and reflected waves come while being dispersed on a time axis, so that the reception strength waveform forms a gentle peak. On the other hand, in FIG. 7D, distances from the reflection surface F2 of the rectangular column 7 to the sonar module 12 are substantially the same, and the depth D2 is small, so that reflected waves come in a concentrated manner on the time axis, and the reception strength waveform forms a sharp peak.

In this way, by evaluating a characteristic of the reception strength waveform of the sonar module 12, the structure and the vehicle can be discriminated from each other.

Next, with reference to FIG. 8, the following describes a method for discriminating between the structure (rectangular column) and the parked vehicle based on a distribution state of the detection point group. FIG. 8 is a diagram for explaining a method for discriminating between the structure (rectangular column) and the parked vehicle based on a ratio of the straight line section occupying the detection point group.

Typically, the vehicle body is typically designed to round a corner part of the front part of the vehicle 5 for the purpose of reducing air resistance and making it easier to pass through a narrow corner. Thus, when an approximate straight line 35e is applied to a detection point group 34e of the sonar, a length of a straight line section 40e in which the detection points are arranged in a straight line is a short portion relatively to a width in which the detection point group is distributed.

On the other hand, in a case in which the rectangular column 7 having the same width as that of the parked vehicle 6 is detected by the sonar, when an approximate straight line 35f is applied to a detection point group 34f of the sonar, a length of a straight line section 40f in which the detection points are arranged in a straight line is substantially equal to a length of one side of the rectangular column 7. For example, most of the width of the detection point group is the straight line section. In this way, the structure (in this case, the rectangular column 7) can be discriminated from the parked vehicle 6 based on the ratio of the straight line section length to the width of the detection point group (a distance between two detection points P farthest from each other belonging to the detection point group). Alternatively, the structure may be discriminated from the parked vehicle 6 based on not only the straight line section length but also magnitude of the variation at the time when the detection point group is linearly approximated. For example, in FIG. 8, a variation 36e of the detection point group 34e related to the parked vehicle 6 is larger than a variation 36f of the detection point group 34f related to the rectangular column 7. The magnitude of the variation can be quantified based on a variance obtained by linearly approximating the detection point group or an average distance from the approximate straight line to the detection point.

Regarding the rectangular column 7, the approximate straight line 35f (first approximate straight line) applied to a front surface and an approximate straight line (second approximate straight line) applied to a side surface are substantially orthogonal to each other. On the other hand, regarding the parked vehicle 6, the approximate straight line connecting the detection points close to the corner part of the vehicle in the detection point group 34e does not orthogonal to the approximate straight line connecting the detection points obtained by detecting a side surface of the parked vehicle 6. Thus, in a case in which orthogonality between the first approximate straight line 35 acquired by the parking support device 10 at the first step and the second approximate straight line 38 acquired at the second step is high, it may be estimated that a corresponding obstacle is the structure (for example, the rectangular column 7) with high possibility.

At the time of disposing the rectangular column 7 in an underground parking lot and the like, the rectangular column 7 is made narrower in an allowable range of strength design to increase the number of vehicles to be accommodated. Thus, in many cases, a length of one side of the rectangular column 7, for example, a length of a straight line section 40a illustrated in FIG. 9 is smaller than 1.8 m (corresponding to the vehicle width of the vehicle 5). In this way, in a case in which the length of the straight line section of the detection point group is smaller than 1.5 m, for example, it can be estimated that the detection point group 34a is part of the rectangular column 7.

A length of a straight line section 40b illustrated in FIG. 9 is a length corresponding to the vehicle width of the parked vehicle 6. In this way, in a case in which the length of the straight line section in the detection point group is equal to or more than 1.5 m and less than 2.1 m, for example, it can be estimated that the detection point group 34b is part of the parked vehicle 6.

Furthermore, a length of a straight line section 40c illustrated in FIG. 9 is equal to or more than 2.1 m, for example, while exceeding the vehicle width. In this way, in a case in which the straight line section length of the detection point group is equal to or more than 2.1 m, for example, it can be estimated that the detection point group 34c is part of a wall or a guardrail.

When the rectangular column 7 is disposed between parking frames, as illustrated in FIG. 9, the rectangular column 7 is often disposed to be retreated from a frontage of the parking frame not to hinder parking. Thus, in a case where the straight line section is present near the passage 27 (along the passage 27), it may be estimated to be the parked vehicle 6, and in a case where it is present at a position retreated from the passage 27, it may be estimated to be the structure such as the rectangular column 7 or a wall.

As illustrated in FIG. 9, in a case in which straight line sections are detected at three or more points and have different angles, the straight line section as a standard of the angle may be determined by a majority vote. For example, angles of the straight line section 40a and the straight line section 40c are substantially the same, but an angle of the straight line section 40b is different from the other two straight line sections, so that it may be estimated that the straight line section 40a and the straight line section 40c are structures, and the angles thereof may be set as the standard of the angle. The variation indicates a deviation from the standard or a mutual difference. For example, variations of the angles of the straight line section 40a and the straight line section 40c are small, and a variation of the angle of the straight line section 40b is large with respect to the other two straight line sections, so that the straight line section 40a and the straight line section 40c the variations of the angles of which are small may be set as the standard of the angle. Furthermore, a car stop may be detected and added to the standard of the angle.

In this way, the parking support device 10 discriminates between the parked vehicle 6 and the rectangular column 7 based on the distribution state of the detection point group 34 detected by the sonar module 12. A surface of the rectangular column 7 facing the passage 27 is typically parallel to the passage 27, and a surface of the rectangular column 7 facing the parking space is typically parallel to the parking space (or orthogonal to the passage 27). Thus, in a case where the parking support device 10 detects the rectangular column 7 being the structure, the parking support device 10 sets the orientation of the surface of the rectangular column 7, for example, the orientation of the approximate straight line 35 as the standard for setting the target parking position. In the following description, a degree of likelihood that the detection point group 34 is estimated to be the structure, based on the small variation 36 of the detection point group 34, the ratio of the approximate straight line 35 applied to the detection point group 34 to the detection point group 34, the length of the straight line section, and consistency in the angle of the straight line section and the angle of the other straight line section, is referred to as a likelihood.

Method for Setting Target Parking Position

Figure 10A:
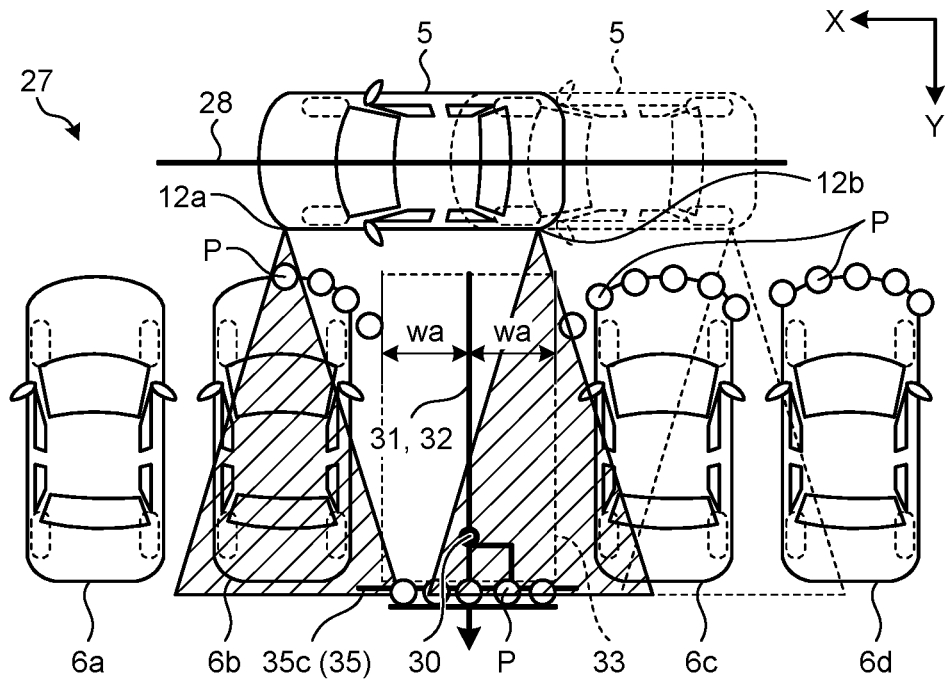
FIG. 10A is a diagram for explaining a method for setting a target parking position in a case of parking between two parked vehicles.
Figure 10B:
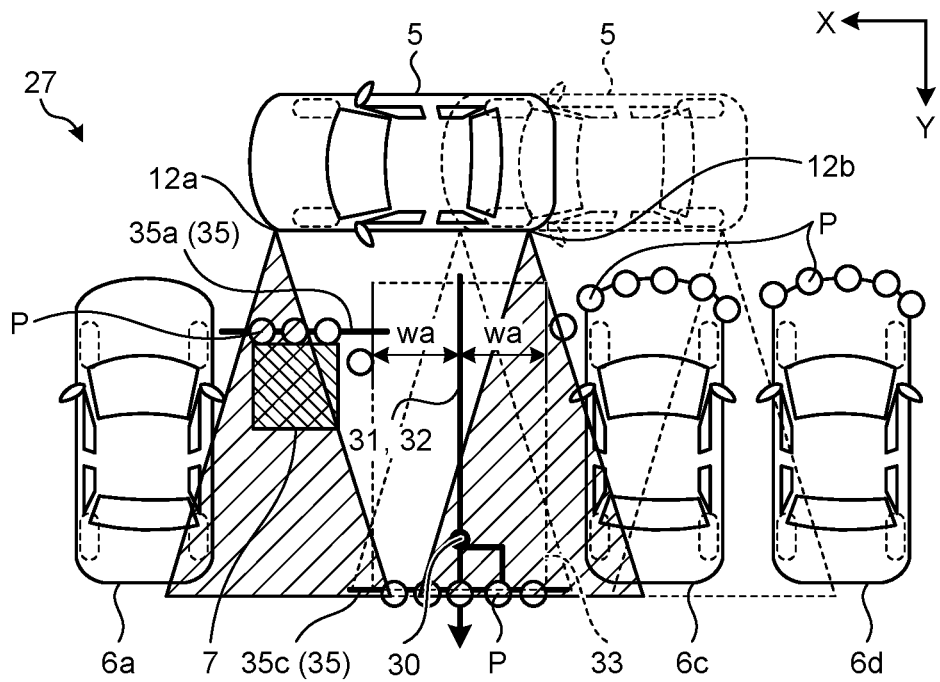
FIG. 10B is a diagram for explaining a method for setting the target parking position in a case of parking between one parked vehicle and a rectangular column.
Figure 10C:
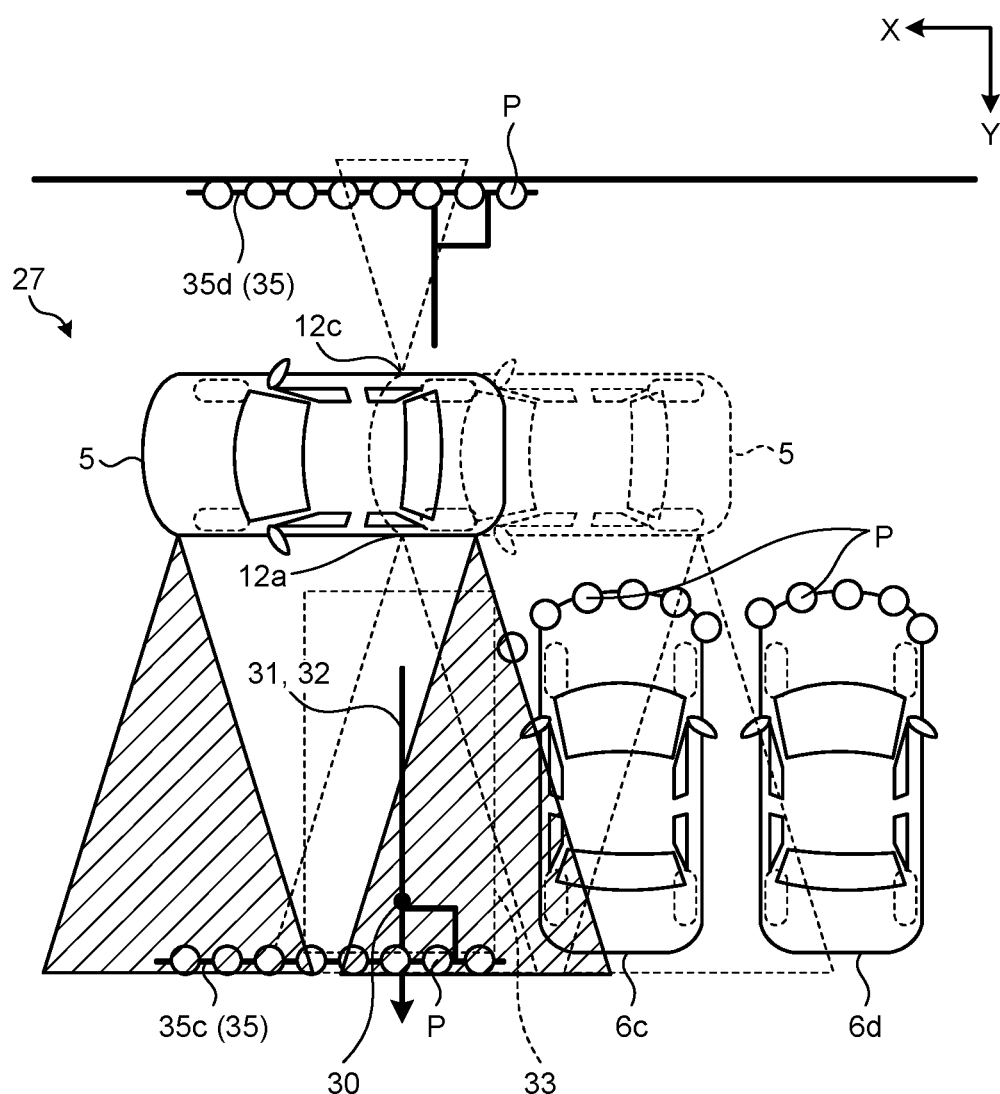
FIG. 10C is a diagram for explaining a method for setting the target parking position in a case of parking to a side of one parked vehicle.
Figure 10D:
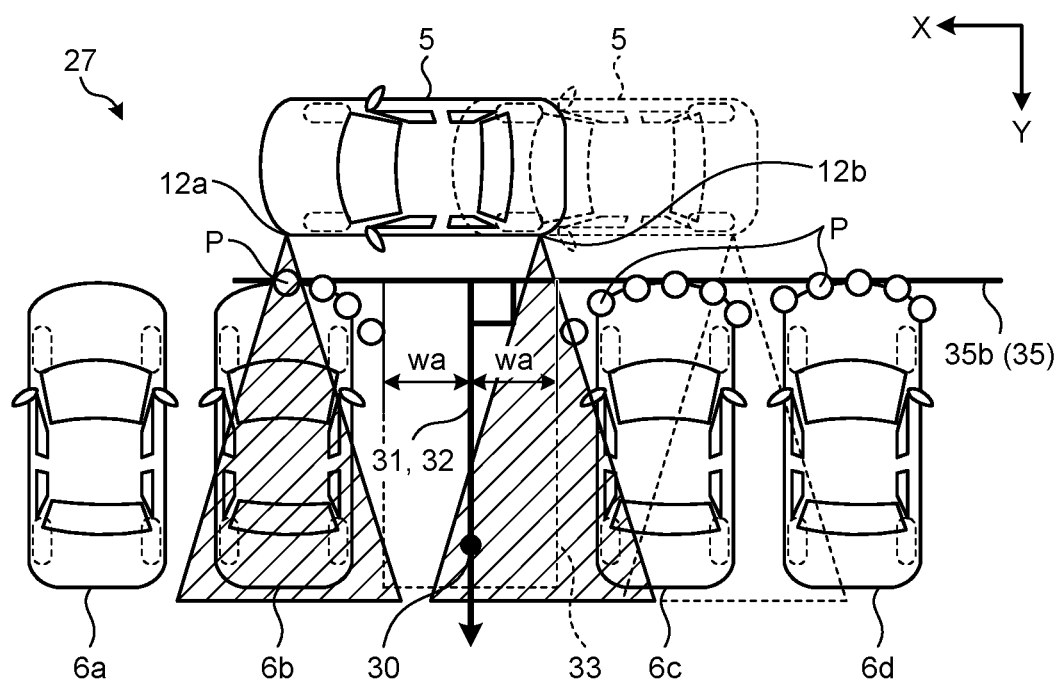
FIG. 10D is a diagram for explaining a method for setting the target parking position in a case in which a structure is not detected.

With reference to FIG. 10A, FIG. 10B, FIG. 10C, and FIG. 10D, the following describes a method for setting the target parking position 33 by the parking support device 10. FIG. 10A is a diagram for explaining a method for setting the target parking position in a case of parking between two parked vehicles. FIG. 10B is a diagram for explaining a method for setting the target parking position in a case of parking between one parked vehicle and the rectangular column. FIG. 10C is a diagram for explaining a method for setting the target parking position in a case of parking to a side of one parked vehicle. FIG. 10D is a diagram for explaining a method for setting the target parking position in a case in which the structure is not detected.

First, with reference to FIG. 10A, the following describes a method for setting the target parking position 33 in a case of parking between two parked vehicles 6b and 6c.

In a case of parking between the two parked vehicles 6b and 6c, and in a case in which there is the detection point group corresponding to the structure (a wall, a guardrail, and the like) at the back of a vacant parking space, the parking support device 10 sets a direction perpendicular to the structure at the back of the parking space as the parking direction 32. The center line 31 of the target parking position is then set at a position having a distance wa from each of ends closer to the parking space, of the left and the right detection point groups across the parking space, and based on the parked vehicles 6b and 6c, 6d. In performing automatic parking, the parking support device 10 controls the vehicle 5 so that the longitudinal axis 28 of the vehicle 5 overlaps with the center line 31 of the target parking position.

The parking support device 10 also sets the parking point 30 based on a relation among the position of the structure at the back, one or both of positions of front ends of the right and the left parked vehicles (parked vehicles 6b and 6c), and the total length of the vehicle 5.

Next, with reference to FIG. 10B, the following describes a method for setting the target parking position 33 in a case of parking between the one parked vehicle 6c and the rectangular column 7.

In such a case, the detection point group corresponding to the rectangular column 7 can be used as a standard of the parking direction 32. For example, the parking support device 10 uses, as the standard, a direction of the approximate straight line 35a applied to the detection point group facing the passage 27 of the rectangular column 7 in FIG. 10B to set a direction orthogonal to the approximate straight line 35a to be the parking direction 32. In a case in which the structure at the back of the parking space can be detected, for example, in a case in which the approximate straight line 35c applied to the detection point group corresponding to the structure at the back of the parking space is detected in FIG. 10B, the parking support device 10 may set a direction orthogonal to the approximate straight line 35c to be the parking direction 32. Alternatively, the parking support device 10 may set the parking direction 32 based on a weighted average of the direction of the approximate straight line 35a and the direction of the approximate straight line 35c. For example, when the rectangular column 7 is thin and the straight line section of the approximate straight line 35a is short, the parking direction 32 may be set by reducing a weight in the direction of the approximate straight line 35a and based on a weight average of the direction of the approximate straight line 35a and the direction of the approximate straight line 35c, or the parking direction 32 may be set based on the direction of the approximate straight line 35c.

The parking support device 10 also sets the parking point 30 so that, at the time when the vehicle 5 is parked at the target parking position 33, a front end of the vehicle 5 is positioned on the approximate straight line applied to the detection point group corresponding to the parked vehicle 6c.

Furthermore, the parking support device 10 sets the center line 31 of the target parking position at a position having the distance wa from each of ends closer to the parking space, of the left and the right detection point groups across the parking space, and based on the rectangular column 7 and the parked vehicle 6c.

Next, with reference to FIG. 10C, the following describes a method for setting the target parking position 33 in a case in which there is a space for two or more vehicles to a side of the one parked vehicle 6c.

In such a case, if the structure is detected in the back of the parking space (in a Y-axis positive direction), the parking support device 10 uses, as a standard, the direction of the approximate straight line 35c applied to the detection point group corresponding to the detected structure to set the parking direction 32 to be a direction orthogonal to the approximate straight line 35c.

In a case in which the structure is not detected at the end of the parking space and the structure is detected to the opposite side of the parking space (in a Y-axis negative direction) across the passage 27, the parking support device 10 uses, as a standard, a direction of an approximate straight line 35d applied to the detection point group corresponding to the structure detected to the opposite side of the parking space to set the parking direction 32 to be a direction orthogonal to the approximate straight line 35d.

The parking support device 10 also sets the parking point 30 so that, at the time when the vehicle 5 is parked at the target parking position 33, the front end of the vehicle 5 is positioned on the approximate straight line applied to the detection point group corresponding to the parked vehicle 6c.

The parking support device 10 then sets the center line 31 of the target parking position at a position having a predetermined distance wb from the parked vehicle 6c. For example, the distance wb may be determined by wb=(the vehicle width of the vehicle 5)÷2+α (α is a predetermined value set in advance), or wb may be set so that the parked vehicles are arranged at regular intervals when the vehicle 5 is parked by measuring a space between the parked vehicles at the time of passing through the front of the parked vehicle 6d and the parked vehicle 6c.

Next, with reference to FIG. 10D, the following describes a method for setting the target parking position 33 in a case of parking between the two parked vehicles 6b and 6c.

In a case of parking between the two parked vehicles 6b and 6c, and in a case in which the structure is not detected, as illustrated in FIG. 10D, the parking support device 10 obtains the approximate straight line 35b based on the detection point groups corresponding to the two vehicles including the parked vehicles 6b and 6c on the left and right of the target parking position 33. The parking direction 32 is then set in a direction orthogonal to the obtained approximate straight line 35b. In a case in which there is the parked vehicle 6d in addition to the two parked vehicles 6b and 6c, the detection point group corresponding to the parked vehicle 6d may be added to the approximate straight line 35b. In a case in which there is the parked vehicle only to one of the left and the right, an approximate straight line applied to an available detection point group may be used.

The parking support device 10 sets the parking point 30 so that the front end of the vehicle 5 is positioned on the approximate straight line 35b at the time when the vehicle 5 is parked at the target parking position 33.

Likelihood of Obstacles on Left and Right of Target Parking Position

Figure 11A:
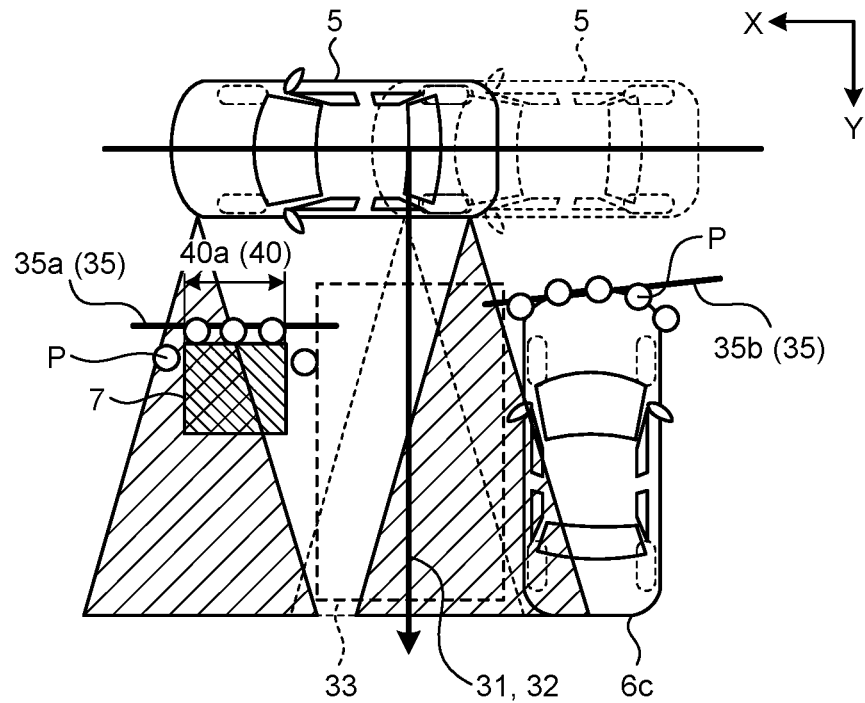
FIG. 11A is a diagram illustrating an example of a case in which a likelihood of an obstacle to a side of the target parking position is high.
Figure 11B:
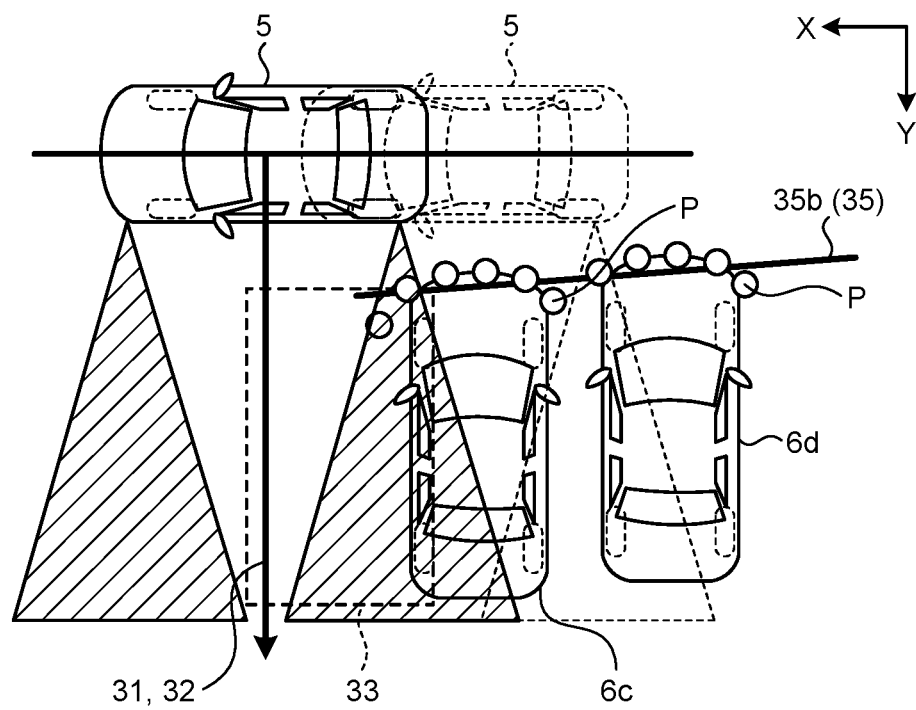
FIG. 11B is a diagram illustrating an example of a case in which the likelihood of the obstacle to the side of the target parking position is low.

With reference to FIG. 11A, FIG. 11B, the following describes likelihoods of obstacles on the left and right of the target parking position 33. FIG. 11A is a diagram illustrating an example of a case in which the likelihood of the obstacle to a side of the target parking position is high. FIG. 11B is a diagram illustrating an example of a case in which the likelihood of the obstacle to the side of the target parking position is low.

At the time of setting the parking direction 32, when there is the structure as a standard such as the rectangular column 7, the parking support device 10 determines that the likelihood of the parking direction 32 is high. On the other hand, when there is no structure as a standard such as the rectangular column 7, the parking support device 10 determines that the likelihood of the parking direction 32 is low. In a case in which a variation from the approximate straight line of the detection point group is large, or in a case in which the number of the detection points used for calculating the approximate straight line is small, the parking support device 10 determines that the likelihood of the parking direction 32 is further lower. The parking support device 10 stores the likelihood of the parking direction 32 at the time of starting automatic parking. The parking support device 10 then uses, at the second step, the stored likelihood to correct the parking direction 32 based on the angle of the detection points of a side surface of the obstacle (the rectangular column or the parked vehicle) adjacent to the target parking position 33 detected by the side sonar. The likelihood of the parking direction 32 is the likelihood that the parking direction 32 is a correct direction, and may also be called certainty or reliability of the parking direction. For example, if the likelihood of the parking direction 32 is low, the parking direction 32 is not certain from the beginning, so that the parking support device 10 may rapidly correct the parking direction 32 to match the angle of the detection points of the side surface of the adjacent obstacle when entering the target parking position 33. Conversely, in a case in which the likelihood of the parking direction 32 is high, the parking support device 10 may correct the parking direction 32 to be maintained as much as possible. Due to this, if there is an accessory on the side surface of the column and specification of the angle of the detection points of the side surface is influenced thereby, the parking support device 10 can suppress variation in the parking direction 32.

In a case in which there are obstacles on the left and right of the target parking position 33, the parking support device 10 assumes the likelihoods of the left and the right obstacles to be a right likelihood and a left likelihood, respectively. A likelihood in a case in which there is no obstacle is assumed to be a likelihood lower than the likelihood in a case in which the obstacle is present, for example, zero. At the time of determining the target parking position 33, the parking support device 10 stores the left and the right likelihoods. At the second step, the parking support device 10 refers to the stored left and right likelihoods, and uses them for selecting which of directions of side surfaces of the obstacles is considered to be important to correct the parking direction 32. The parking support device 10 may store the left and the right likelihoods and the likelihood of the parking direction 32 separately. As a simple configuration, at the second step, the parking support device 10 may store the left and the right likelihoods without calculating the likelihood of the parking direction 32, and may use a larger one of the left and the right likelihoods as the likelihood of the parking direction 32 at the second step. The following describes examples of the right likelihood and the left likelihood.

For example, FIG. 11A illustrates an example in which the likelihood of the left of the target parking position 33 is high, and the likelihood of the right of the target parking position 33 is low.

In FIG. 11A, a ratio of the length of the straight line section 40a occupying the width of the detection point group detected from the left of the target parking position 33 is higher than a ratio of the straight line section length occupying the width of the detection point group detected from the left of the target parking position 33. Thus, the parking support device 10 calculates the likelihood of the detection point group detected from the left of the target parking position 33 so as to be higher than the likelihood of the detection point group detected from the right of the target parking position 33. As a result, of the left and the right likelihoods to be stored, the likelihood of the left is higher.

FIG. 11B illustrates an example in which the likelihood of the left of the target parking position 33 is zero, and the likelihood of the right of the target parking position 33 is low.

For example, in FIG. 11B, no detection point is detected from the left of the target parking position 33. Thus, the parking support device 10 determines that the likelihood of the left of the target parking position 33 is zero.

The ratio of the straight line section length occupying the width of the detection point group detected from the right of the target parking position 33 is smaller than a predetermined threshold, so that the parking support device 10 calculates a low likelihood for the detection point group detected from the right of the target parking position 33. However, the likelihood is higher than that in a case in which there is no detection point, so that, regarding the left and the right likelihoods to be stored, the right likelihood is higher.

Herein, described is the example of calculating the likelihood based on the ratio of the straight line section length occupying the width of the detection point group, but the likelihood may be calculated based on magnitude of the variation of the detection point group, or based on the straight line section length of the detection point group. For example, in FIG. 11A, the point that the length of the straight line section 40a is shorter than the vehicle width (1.8 m) may be evaluated, and the likelihood may be added.

Moving Route of Vehicle after Setting Target Parking Position

Figure 12A:
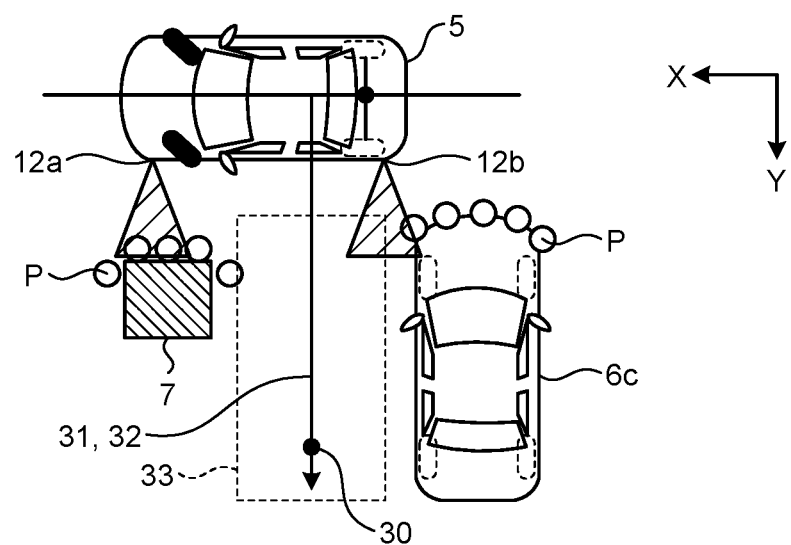
FIG. 12A is a diagram illustrating an example of a state immediately before the vehicle starts automatic parking.
Figure 12B:
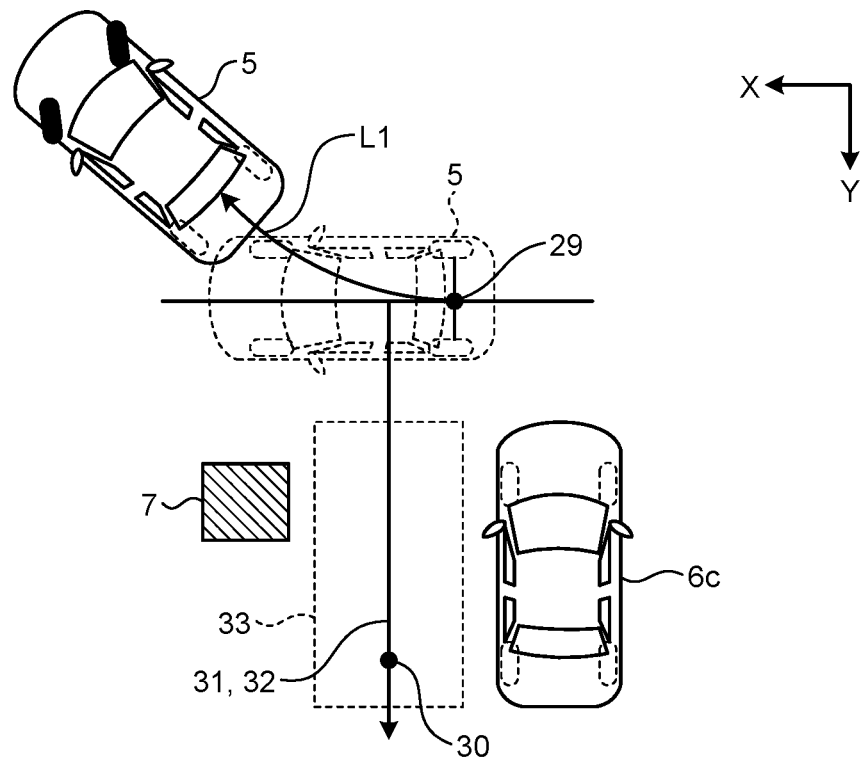
FIG. 12B is a diagram illustrating an example of a state in which the vehicle arrives at a turning back point.
Figure 12C:
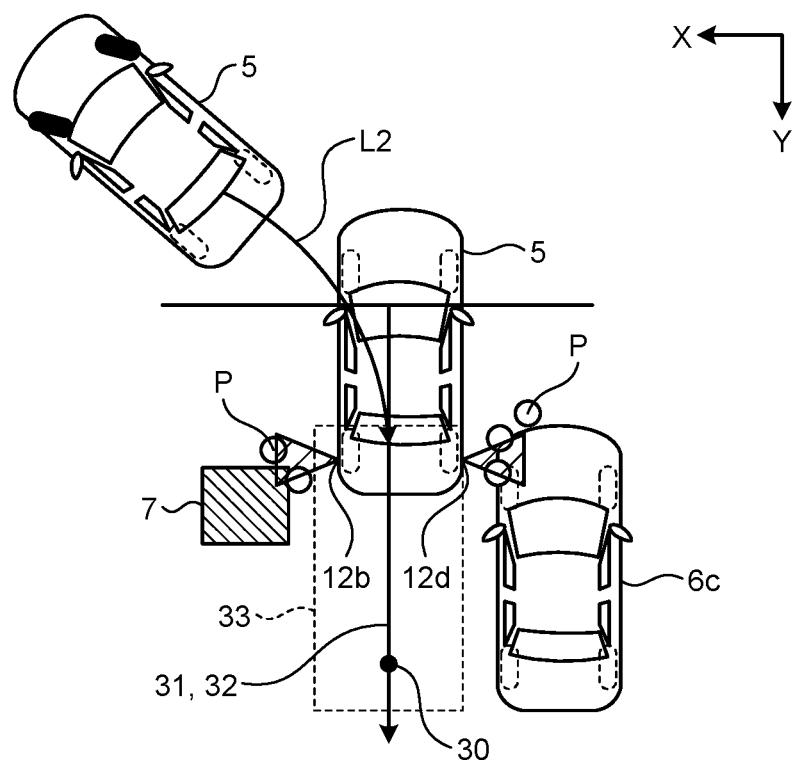
FIG. 12C is a diagram illustrating an example of a state in which the vehicle moves backward toward the target parking position.

With reference to FIG. 12A, FIG. 12B, and FIG. 12C, the following describes a moving route of the vehicle 5 after the target parking position 33 is determined. FIG. 12A is a diagram illustrating an example of a state immediately after the vehicle starts automatic parking. FIG. 12B is a diagram illustrating an example of a state in which the vehicle arrives at a turning back point. FIG. 12C is a diagram illustrating an example of a state in which the vehicle moves backward toward the target parking position.

When the target parking position 33, for example, the parking point 30, the center line 31 of the target parking position, and the parking direction 32 are determined, the parking support device 10 calculates the parking route. Thereafter, as illustrated in FIG. 12A, the vehicle 5 starts to turn to the right at the maximum steering angle at an automatic parking start position.

Subsequently, as illustrated in FIG. 12B, when the vehicle 5 turns about 45 degrees along the parking route L1, the parking support device 10 causes the vehicle 5 to temporarily stop. The parking support device 10 then turns the steering angle of the vehicle 5 to the left, and starts to move backward toward the target parking position 33.

Thereafter, as illustrated in FIG. 12C, the parking support device 10 causes the vehicle 5 to move backward along the parking route L2. In this way, after starting automatic parking, the parking support device 10 automatically controls the steering angle, gear, and the vehicle speed to cause the vehicle 5 to travel along the parking routes L1 and L2 set in advance. The parking support device 10 then adjusts the steering angle at the time of backward movement so that, when the middle point between the back wheels of the vehicle 5 gets on the center line 31 of the target parking position, the vehicle body is oriented in the parking direction 32 at the same time. The vehicle speed of the vehicle 5 is, for example, limited to about 8 km/h in the parking lot, and limited to about 5 km/h during automatic parking.

Control of Correction Amount Based on Likelihood of Parking Direction

Figure 13A:
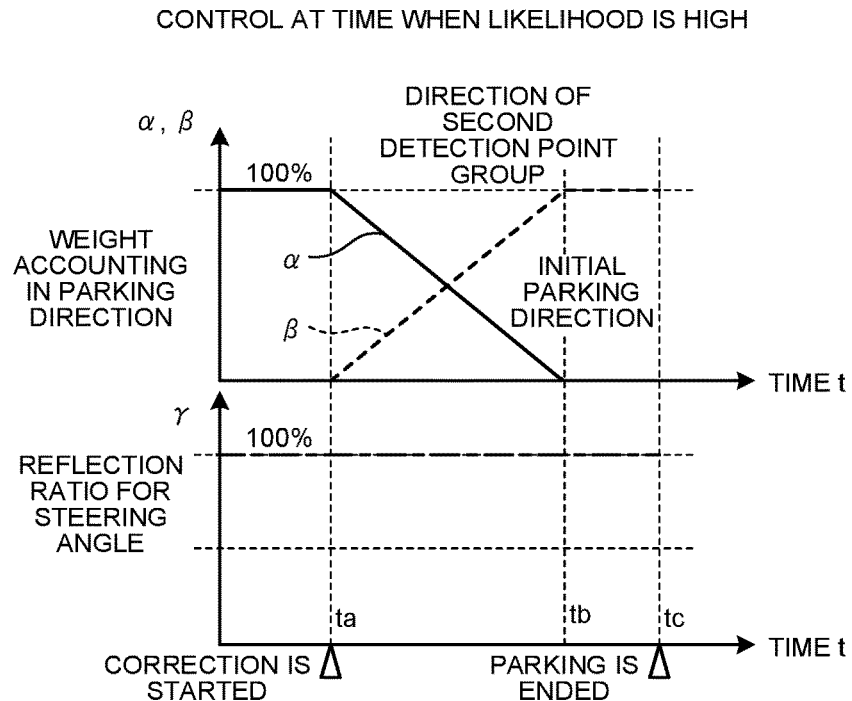
FIG. 13A is a diagram for explaining a method for controlling a correction amount of a steering angle of the vehicle in a case in which the likelihood that the detection point group is estimated to be the structure is high.
Figure 13B:
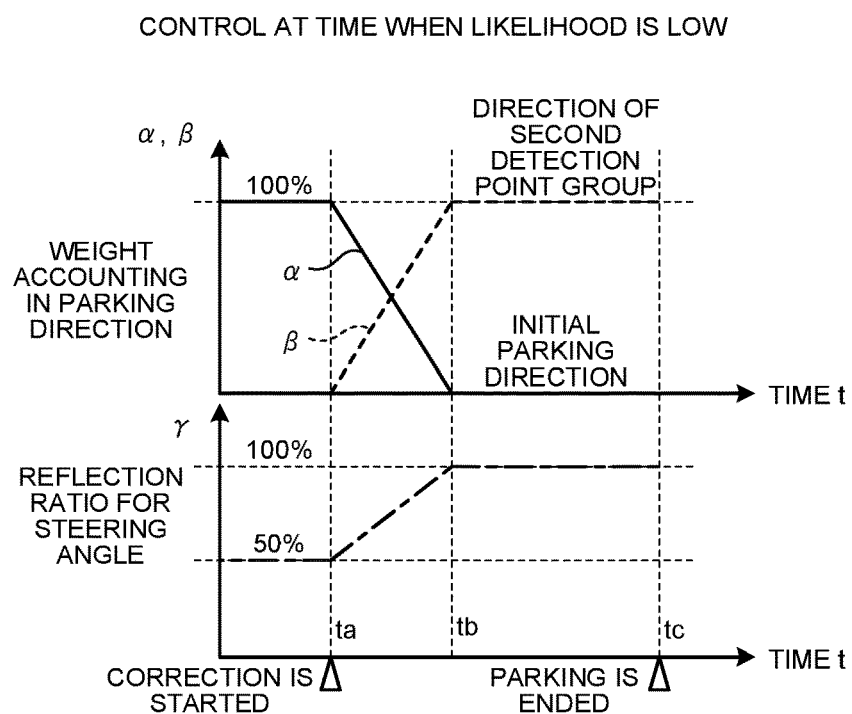
FIG. 13B is a diagram for explaining a method for controlling the correction amount of the steering angle of the vehicle in a case in which the likelihood that the detection point group is estimated to be the structure is low.

With reference to FIG. 13A and FIG. 13B, the following describes a method for controlling a correction amount of the steering angle of the vehicle 5 as the processing at the second step in accordance with the likelihood of the parking direction that is stored by the parking support device 10 at the time of determining the parking direction as the processing at the first step. FIG. 13A is a diagram for explaining a method for controlling the correction amount of the steering angle of the vehicle in a case in which the likelihood of the parking direction is high. FIG. 13B is a diagram for explaining a method for controlling the correction amount of the steering angle of the vehicle in a case in which the likelihood of the parking direction is low.

First, with reference to FIG. 13A, the following describes the case in which the likelihood of the parking direction is high.

At the time when the side sonar detects the side surface of the obstacle adjacent to the target parking position 33 (refer to FIG. 4) to correct the parking direction 32, if the likelihood of the parking direction 32 is high at the time when the parking direction 32 is determined at first, the parking support device 10 performs correction to reflect an angle of the side surface of the obstacle, for example, a direction of the second detection point group in the parking direction 32 in proportion to a ratio with which the vehicle 5 can fit into the target parking position 33.

For example, as illustrated in FIG. 13A, assuming that a ratio of the initially set parking direction 32 occupying the parking direction 32 is a weighting factor $\alpha$, and a ratio of the direction of the second detection point group occupying the parking direction 32 is a weighting factor $\beta$, the weighting factor $\alpha$ is monotonously decreased and the weighting factor $\beta$ is monotonously increased from a time ta when correction is started to a time tb under a restriction of $\alpha+\beta=1$. From the time tb to a time tc when parking is ended, the weighting factor $\beta$ for the direction of the second detection point group is assumed to be 1. Processing of determining the weighting factor may be referred to as weighting, and increasing the weighting factor may be referred to as assigning a higher weight. The weighting factor may be simply referred to as a weight.

The parking support device 10 reflects a difference between the angle of the vehicle 5 and the parking direction 32 in the steering angle of the vehicle 5 by 100% over the entire period. For example, the parking direction 32 is stabilized when the likelihood of the parking direction 32 is high, so that a reflection ratio $\gamma$ for the steering angle may be set to be 100% as illustrated in FIG. 13A. By performing such steering angle control, the parking direction 32 gradually matches the angle of the side surface of the structure the likelihood of which is high, the angle of the vehicle 5 becomes parallel to the side surface of the structure the likelihood of which is high, and parking is ended.

Next, with reference to FIG. 13B, the following describes a case in which the likelihood of the parking direction 32 is low.

In a case in which the likelihood of the parking direction 32 is low, the parking support device 10 reflects the angle of the side surface of the obstacle adjacent to the target parking position 33 in the steering angle of the vehicle 5 more rapidly than the case in which the likelihood is high. For example, a time difference between the time to when correction is started and the time tb when the direction of the second detection point group is reflected by 100% in the parking direction is reduced as compared with the case in which the likelihood is high (FIG. 13A). When the likelihood of the parking direction 32 is low, there is the possibility that the direction of the first detection point group is not correct, and the initially set parking direction 32 may be largely deviated from a correct parking direction, so that the parking support device 10 may reflect the direction of the second detection point group in the vehicle body attitude (the angle of the vehicle 5) at a time point earlier than that in the case in which the likelihood of the parking direction 32 is high. The vehicle body attitude is changed by changing the steering angle, and the vehicle body attitude is changed when the vehicle moves backward after changing the steering angle (for example, there is a time difference between a time when the steering angle is changed and a time when the vehicle body attitude is changed), so that the steering angle may be controlled to follow the direction of the second detection point group at a time point earlier than the end of parking.

The time when control of the steering angle is started is a time when the second detection point group starts to be detected, and when the detection points appear at positions deviated outward from an actual surface of the obstacle and are linearly approximated, an angle different from that of the actual surface of the obstacle may be obtained. Thus, if the direction of the second detection point group is reflected in the parking direction 32, the direction of the vehicle 5 may be suddenly changed, so that the reflection ratio γ for reflecting the difference between the angle of the vehicle 5 and the parking direction 32 in the steering angle of the vehicle 5 is suppressed to be 50% at the time to when correction is started, as illustrated in FIG. 13B. As detection of the side surface of the obstacle adjacent to the target parking position 33 proceeds, the reflection ratio is monotonously increased, and the reflection ratio γ for the steering angle is set to be 100% after the time tb. Herein, in the case in which the likelihood of the parking direction 32 is low, control is additionally performed to suppress a variation amount of the steering angle at the time when control of the steering angle is started while considering that the reflection ratio of the direction of the second detection point group for the parking direction 32 is caused to be high at an earlier time. However, the phenomenon that variation of the steering angle is increased when control of the steering angle is stared may be caused also in the case in which the likelihood of the parking direction 32 is low, so that control for suppressing variation of the steering angle at the time when control of the steering angle is started may be performed irrespective of magnitude of the likelihood of the parking direction 32.

Figure 14A:
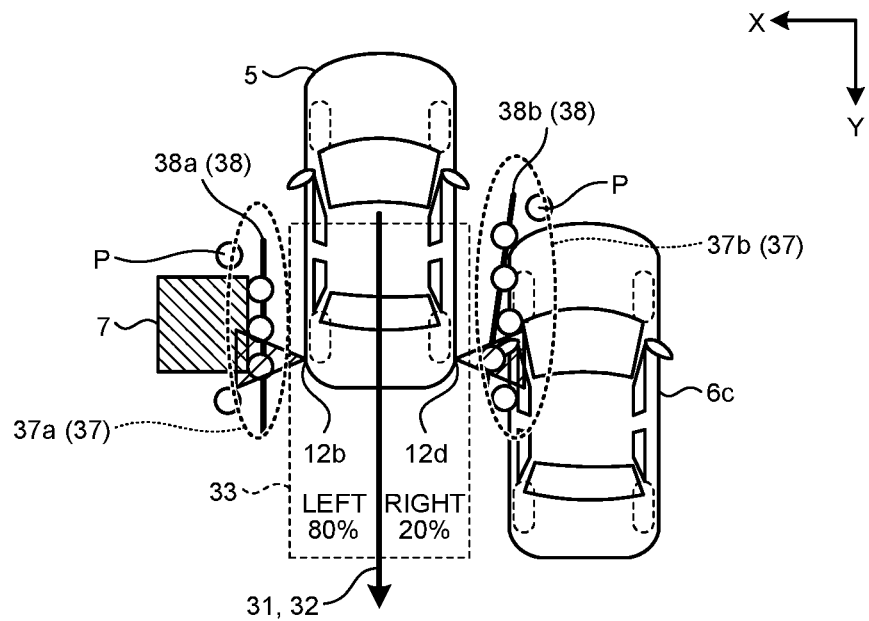
FIG. 14A is a diagram for explaining weighting at the time of correcting a parking direction in a case in which a likelihood of an obstacle to the left of the vehicle is higher than a likelihood of an obstacle to the right.
Figure 14B:
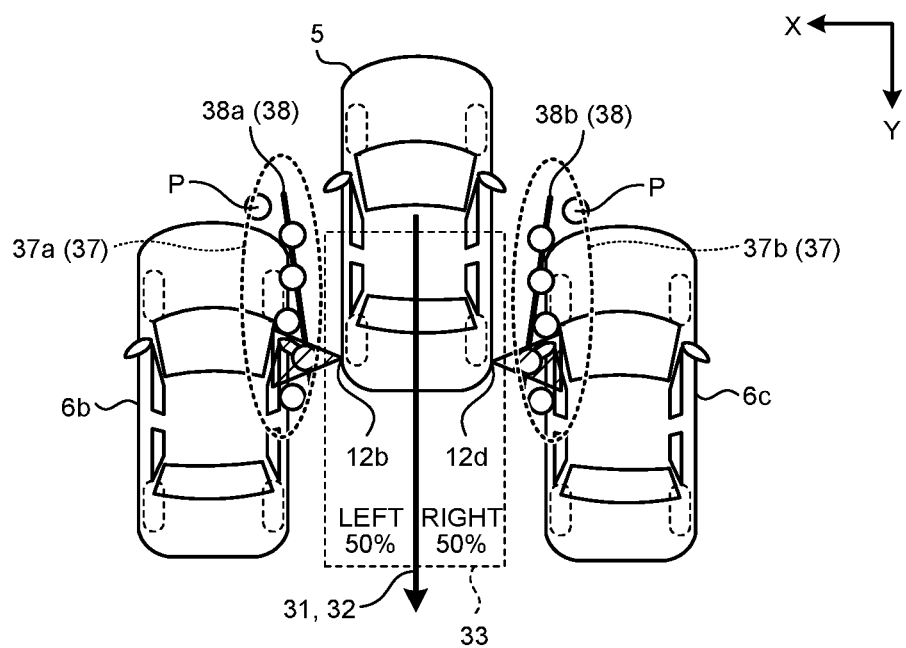
FIG. 14B is a diagram for explaining weighting at the time of correcting the parking direction in a case in which likelihoods of both obstacles to the left and the right of the vehicle are low.
Figure 14C:
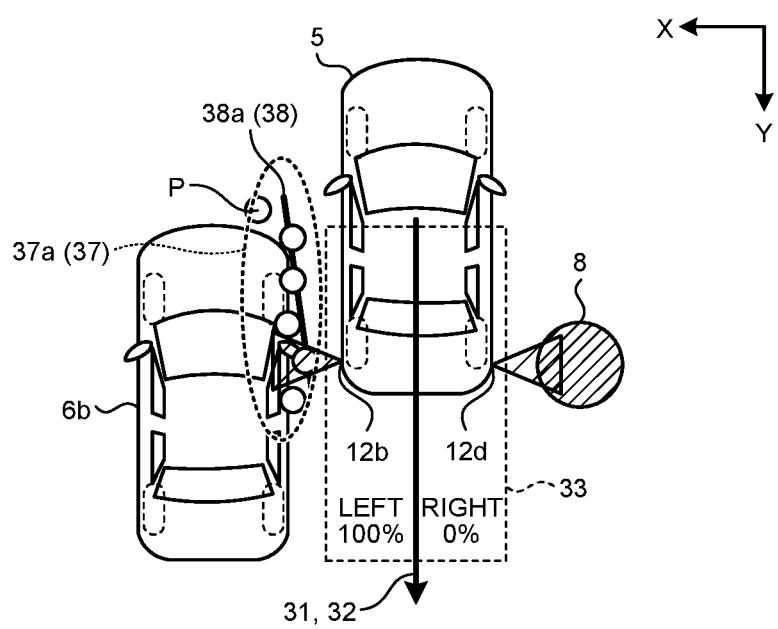
FIG. 14C is a diagram for explaining weighting at the time of correcting the parking direction in a case in which the likelihood of the obstacle to the left of the vehicle is low and the likelihood of the obstacle to the right is 0.

Weighting in Accordance with Likelihoods of Left and Right Obstacles at Time of Correcting Parking Direction With reference to FIG. 14A, FIG. 14B, and FIG. 14C, the following describes weighting at the time when the parking support device 10 corrects the parking direction 32 in accordance with the likelihoods of the obstacles on the left and right of the target parking position 33. FIG. 14A is a diagram for explaining weighting at the time of correcting the parking direction in a case in which the likelihood of the obstacle to the left of the vehicle is higher than the likelihood of the obstacle to the right. FIG. 14B is a diagram for explaining weighting at the time of correcting the parking direction in a case in which the likelihoods of both obstacles on the left and right of the vehicle are low. FIG. 14C is a diagram for explaining weighting at the time of correcting the parking direction in a case in which the likelihood of the obstacle to the left of the vehicle is low and the likelihood of the obstacle to the right is 0.

Before reaching the state in FIG. 14, at the time of setting the parking direction 32, the parking support device 10 has evaluated the detection point groups of front surfaces (surfaces closer to the passage) of the obstacles detected when the vehicle is traveling the passage, and has calculated and stored the likelihoods of the respective obstacles. In the state of FIG. 14, the parking support device 10 determines, at the time when the sonar modules 12b and 12d (side sonar) detect the side surfaces of the obstacles adjacent to the target parking position 33 to correct the parking direction 32, which of the side surfaces of the obstacles to the left and the right is considered to be important to correct the parking direction 32 based on the stored likelihoods corresponding to the detection point groups detected at the front surfaces (surfaces closer to the passage) of the obstacles.

For example, as illustrated in FIG. 14A, in a case in which there is the obstacle having a high likelihood such as the rectangular column 7 to the left of the vehicle 5, for example, and there is the obstacle having a low likelihood such as the parked vehicle 6c to the right of the vehicle 5, for example, the parking support device 10 reflects the angle of the side surface of the rectangular column 7 at a ratio of 80% and the angle of the side surface of the parked vehicle 6c at a ratio of 20% in correction of the parking direction 32. These ratios (80% and 20%) are weighting factors for the left and right, and weights are assigned in accordance with the likelihoods of the left and the right obstacles. For example, in a case where the second detection point group 37 is divided into the first detection point small group 37a and the second detection point small group 37b, the parking support device 10 assigns a higher weight to the detection point small group having a stored higher likelihood of the detection point group closer to the passage, than the detection point small group having a stored lower likelihood. In a case where the second detection point group 37 is divided into the first detection point small group 37a and the second detection point small group 37b, the parking support device 10 may assign a higher weight to the detection point small group in which the number of the detection points P distributed in a direction substantially parallel to the parking direction is larger, than the detection point small group in which the number of the detection points P is small, or may cause a weight of one in which the number of the detection points P is smaller, to be smaller than a weight based on the stored likelihood. For example, the likelihood of the surface closer to the passage, of the rectangular column 7 is high, so that it can be expected that a favorable vehicle body attitude can be achieved when the parking direction 32 is controlled based on the side surface of the rectangular column 7

(surface substantially parallel to the parking direction). However, in a case in which a structure such as a pipe is present on the side surface of the rectangular column 7, the number of the detection points distributed on a straight line is small, and the side surface is inappropriate as a standard of the angle for correcting the parking direction 32, parking can be performed with more favorable vehicle body attitude by reevaluating the likelihood (left likelihood) of the rectangular column 7 to be low, and controlling the parking direction 32 while increasing the weight of one (for example, of the parked vehicle 6c) in which the number of the detection points P distributed in the direction substantially parallel to the parking direction is larger. In contrast, in a case in which the side surface of the rectangular column 7 includes a straight line section having a length exceeding a predetermined threshold, and the straight line section is substantially perpendicular to the angle of the surface closer to the passage, of the rectangular column 7, the likelihood (left likelihood) of the rectangular column 7 may be reevaluated to be higher, and the ratio based on the angle of the rectangular column may be increased.

In a case in which there are the parked vehicles 6b and 6c to both sides of the vehicle 5 as illustrated in FIG. 14B, the stored likelihoods on the left and right are equivalent to each other, so that the parking support device 10 reflects the angle of the detection point group to the left of the target parking position 33 at a ratio of 50% and the angle of the detection point group to the left of the target parking position 33 at a ratio of 50% in correction of the parking direction 32.

As illustrated in FIG. 14C, in a case in which the parked vehicle 6b is present to one side of the target parking position 33, and nothing is present to the other side or a round column 8 the angle of the side surface of which is difficult to be specified is present to the other side, the stored right likelihood is zero or a value close to zero. Thus, the parking support device 10 reflects the angle of the parked vehicle 6b to the left of the target parking position 33 in correction of the parking direction 32 by 100%. The parking support device 10 does not necessarily use information on the right of the target parking position 33 for correcting the parking direction 32.

At the time of setting the parking direction 32, the parking support device 10 may calculate a likelihood of a right side surface and a likelihood of a left side surface of the target parking position 33 distributed in the direction substantially parallel to the parking direction without storing the likelihood of the detection point group of the front surface (surface closer to the passage) of the obstacle detected during traveling in the passage. The parking support device 10 may determine a reflection ratio at the time of reflecting angles of the left and the right side surfaces of the target parking position 33 in the parking direction 32 based on the likelihood of the right side surface and the likelihood of the left side surface that have been calculated.

Figure 15A:
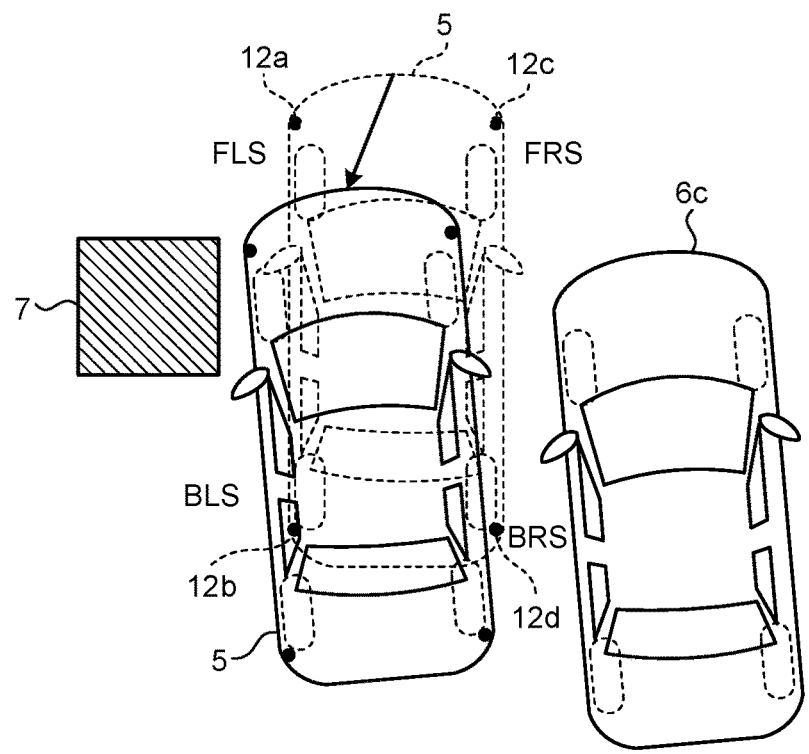
FIG. 15A is a diagram for explaining an operation of a conventional parking support device.
Figure 15B:
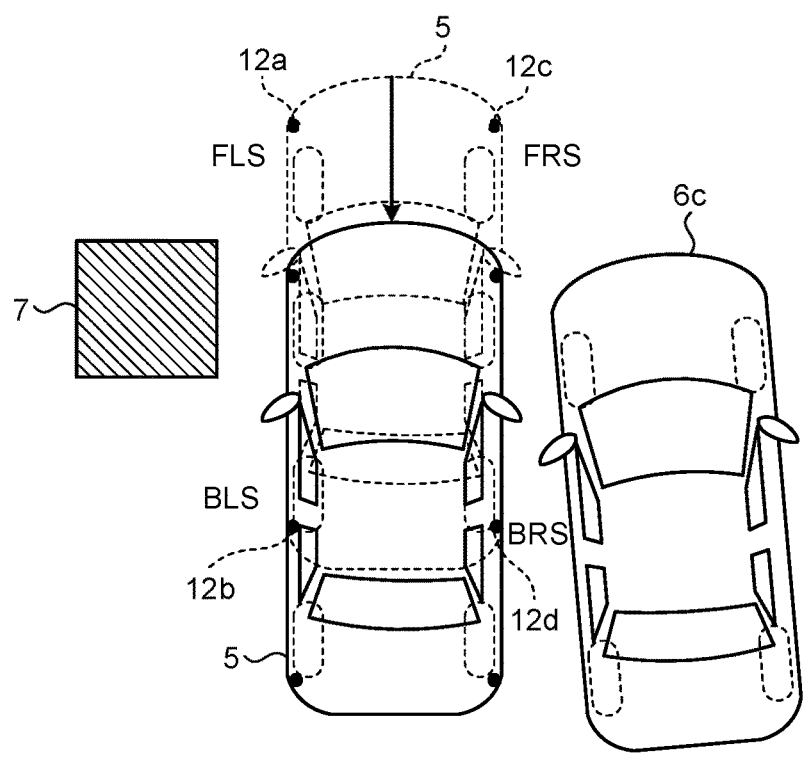
FIG. 15B is a diagram for explaining an operation of the parking support device according to the present embodiment.

Comparison Between Operations of Conventional Parking Support Device and Parking Support Device According to Present Embodiment With reference to FIG. 15A and FIG. 15B, the following describes a difference between an operation of a conventional parking support device and an operation of the parking support device 10 according to the present embodiment. FIG. 15A is a diagram for explaining the operation of the conventional parking support device. FIG. 15B is a diagram for explaining the operation of the parking support device according to the present embodiment.

As illustrated in FIG. 15A, the conventional parking support device has evaluated the direction of the obstacle based on the length of the straight line section of the detection point group detected by the sonar. Additionally, in a case in which the length of the straight line section of the detection point group does not exceed a threshold, the detection point group is not used as a standard of the angle of the vehicle 5. Thus, steering angle control for the vehicle 5 is not started until the vehicle 5 enters between the left and the right obstacles by a certain distance or more.

For example, at the time when the vehicle 5 moves backward in FIG. 15A, in a case in which the length of the straight line section of the detection point group detected from the side surface of the parked vehicle 6c exceeds the threshold and the length of the side surface of the rectangular column 7 on the left is equal to or smaller than the threshold, the conventional parking support device does not use the side surface of the rectangular column 7 the length of which is short as the standard of the angle, and starts steering angle control to cause the direction of the vehicle 5 to be parallel to the side surface of the parked vehicle 6c. At this point, the front end of the vehicle 5 can move to the left and right more easily than the back end thereof, so that, when the steering angle is controlled to be parallel to the parked vehicle 6c, the front end is swayed to the left. This motion suddenly starts at the time when the length of the straight line section of the detection point group detected from the parked vehicle 6c exceeds the threshold, so that an occupant of the vehicle 5 may be surprised. Furthermore, a trouble may be caused such that the vehicle 5 approaches the rectangular column 7, and a person cannot pass through a space between the vehicle 5 and the rectangular column 7.

The automatic parking performed by the conventional parking support device is started by planning to position the vehicle 5 at the center between the left and the right obstacles. However, steering angle control is started after a half of the vehicle 5 enters the parking frame, so that the parking is ended in a state in which the front end of the vehicle 5 is swayed to the left. If steering angle control is started when a back wheel portion of the vehicle 5 enters the parking frame, the vehicle 5 can enter the parking frame after changing the vehicle body attitude, so that the parking is not ended in a state in which the front end of the vehicle 5 is swayed to the left. In this way, start of the steering angle control may be delayed with the conventional parking support device.

The parked vehicle 6c may be obliquely parked as illustrated in FIG. 15A, but the structure such as the rectangular column 7 is typically disposed in parallel with the parking frame, so that the structure is preferable as the standard of the angle at the time of performing automatic parking. However, the conventional parking support device has determined whether to use the detection point group as the standard for controlling the steering angle of the vehicle 5 on the condition that the length of the straight line section of the detection point group exceeds the threshold, so that the structure such as the rectangular column 7 the length of the straight line section of which is short may be difficult to be used as the standard for controlling the steering angle of the vehicle 5 in some cases.

On the other hand, the parking support device 10 according to the present embodiment detects the surface closer to the passage, of the obstacle facing the passage at a time point before starting to enter the parking frame, and determines whether the obstacle is the structure such as a rectangular column or a wall surface, or a parked vehicle. At this point, on the condition that the length of the straight line section of the detection point group is equal to or smaller than the vehicle width, it is determined that the obstacle is not a parked vehicle but the structure such as a rectangular column, so that, if the length of the straight line section is short, the detection point group is not excluded from the standard of the angle. In a case in which it is determined that the obstacle is the structure, the side surface of the structure is estimated to be perpendicular to the surface closer to the passage, and the parking direction is determined so that the orientation of the vehicle 5 at the time of parking becomes parallel to the side surface of the structure. The parking support device according to the present embodiment 10 then controls the steering angle so that the vehicle 5 becomes parallel to the side surface of the structure at the time of entering the parking space to the side of the structure. Accordingly, as illustrated in FIG. 15B, the vehicle body attitude at the time when the parking is completed can be caused to be parallel to the side surface of the rectangular column 7 as the structure, and the parking can be completed in a more preferable state.

The parking support device 10 according to the present embodiment corrects a target parking angle by performing weighted addition corresponding to an evaluation value of linearity at a time point when starting to detect the left and the right obstacles even when there is no structure around the parking frame, so that the parking support device 10 can preferably perform automatic parking because steering angle control has been started at an early stage.

Functional Configuration of Sensor Control Unit

Figure 16:
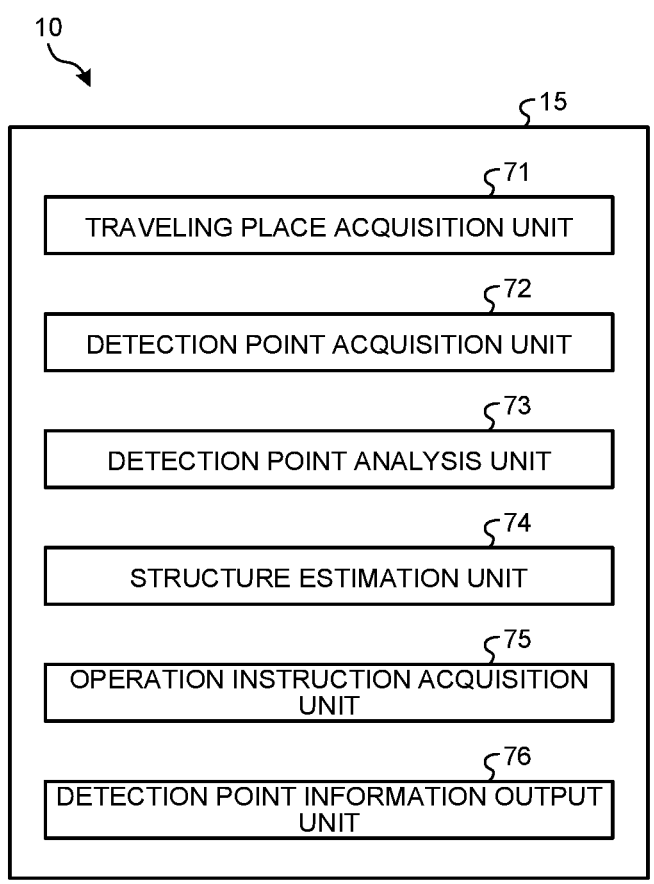
FIG. 16 is a functional block diagram illustrating an example of a functional configuration of a sensor control unit provided in the parking support device.

With reference to FIG. 16, the following describes a functional configuration of the sensor control unit 15 provided in the parking support device 10. FIG. 16 is a functional block diagram illustrating an example of the functional configuration of the sensor control unit provided in the parking support device.

The sensor control unit 15 includes a traveling place acquisition unit 71, a detection point acquisition unit 72, a detection point analysis unit 73, a structure estimation unit 74, an operation instruction acquisition unit 75, and a detection point information output unit 76.

The traveling place acquisition unit 71 acquires the own vehicle position information on the vehicle 5 from the positioning processing unit 17. The traveling place acquisition unit 71 starts the parking support device 10 when it is determined that the current position of the vehicle 5 moves from a road into an off-road region.

The detection point acquisition unit 72 acquires, from the sonar module 12, information on the detection points P indicating positions at which obstacles around the vehicle 5 are detected. The detection point acquisition unit 72 also acquires the reception strength waveform indicating a change of the reception strength I of the sonar module 12 with respect to the time. The detection point acquisition unit 72 is an example of an acquisition circuit according to the present disclosure.

The detection point analysis unit 73 divides the detection points P into the detection point groups 37, calculates the approximate straight lines 35 and 38 applied to the respective detection point groups 37, and calculates the variations 36 and 39 of the detection points P with respect to the approximate straight lines 35 and 38 calculated from the respective detection point groups 37. The detection point analysis unit 73 is an example of an analysis circuit according to the present disclosure.

The structure estimation unit 74 calculates the likelihood indicating a likelihood of estimating each of the first detection point group 34 and the second detection point group 37 to be the detection point group indicating the structure. The structure estimation unit 74 calculates the likelihood for the detection point group having a smaller variation so as to be higher than for the detection point group having a larger variation of the first variation 36 and the second variation 39. The structure estimation unit 74 also calculates the likelihood for the approximate straight line substantially parallel to or substantially perpendicular to another approximate straight line so as to be higher than for the approximate straight line that is not substantially parallel to or substantially perpendicular to any other approximate straight lines among the first approximate straight line 35 and the second approximate straight line 38. The structure estimation unit 74 also calculates the likelihood for the detection point group in which the ratio of the length of a straight line section 40 of the detection point group 34 to the width of the first detection point group 34 is larger, so as to be higher than for the detection point group in which the ratio is smaller. In a case in which the length of the straight line section 40 of the detection point group 34 is close to the vehicle width (for example, 1.8 m) of a four-wheeled vehicle, the structure estimation unit 74 evaluates the likelihood so as to be lower than a case in which the length of the straight line section 40 is largely different from the vehicle width of the four-wheeled vehicle. The structure estimation unit 74 also estimates the likelihood based on the reception strength waveform received by the detection point acquisition unit 72. The structure estimation unit 74 is an example of an estimation circuit according to the present disclosure.

The operation instruction acquisition unit 75 acquires operation information on the occupant of the vehicle 5 from the operation unit 14.

The detection point information output unit 76 outputs an analysis result of the detection point analysis unit 73 and an estimation result of the structure estimation unit 74 to the parking support unit 13.

Functional Configuration of Parking Support Unit

Figure 17:
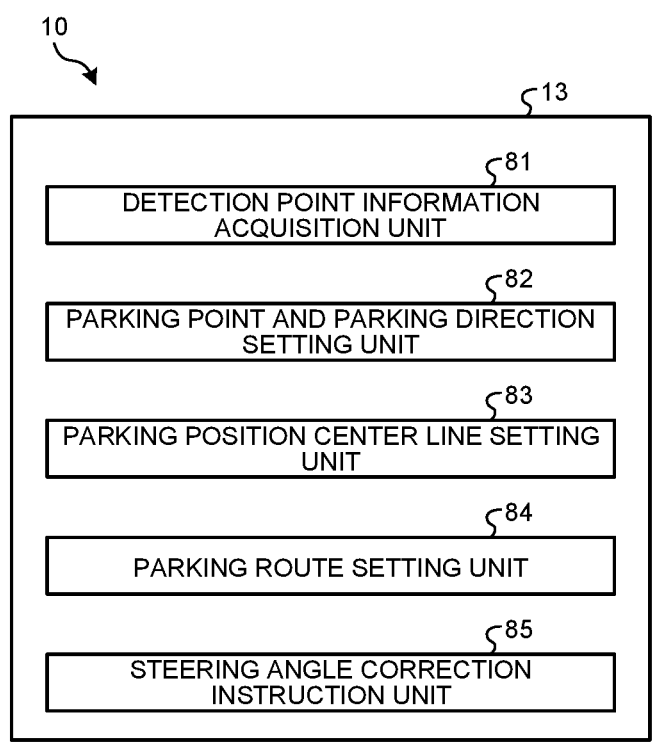
FIG. 17 is a functional block diagram illustrating an example of a functional configuration of a parking support unit provided in the parking support device.

With reference to FIG. 17, the following describes a functional configuration of the parking support unit 13 provided in the parking support device 10. FIG. 17 is a functional block diagram illustrating an example of the functional configuration of the parking support unit provided in the parking support device.

The parking support unit 13 includes a detection point information acquisition unit 81, a parking point and parking direction setting unit 82, a parking position center line setting unit 83, a parking route setting unit 84, and a steering angle correction instruction unit 85.

The detection point information acquisition unit 81 acquires the analysis result of the detection point analysis unit 73 and the estimation result of the structure estimation unit 74 from the sensor control unit 15.

The parking point and parking direction setting unit 82 sets the parking point 30 at which the vehicle 5 is parked based on the first detection point groups 34, and sets the parking direction 32 as the direction of the vehicle 5 at the parking point 30 based on the approximate straight line 35 and the variation 36. The parking point and parking direction setting unit 82 calculates the weighting factor for the first approximate straight line 35 based on the first variation 36, and sets the parking direction 32 using the weighting factor of the first approximate straight line 35 and the direction of the first approximate straight line 35. The parking point and parking direction setting unit 82 also extracts the detection point groups positioned on the left and right of the center line 31 of the target parking position from the first detection point groups 34, and calculates the likelihoods of the detection point groups on the left and right, for example, the left and the right likelihoods, and the likelihood of the parking direction 32 to be stored therein. The first variation 36 may be also referred to as the left and the right likelihoods. For example, the weighting factor is calculated based on the left and the right likelihoods. The parking point and parking direction setting unit 82 is an example of a setting circuit according to the present disclosure.

The parking position center line setting unit 83 sets the center line 31 of the target parking position passing through the parking point 30 and passing through the front and the back of the vehicle 5 along the parking direction 32.

The parking route setting unit 84 sets the parking routes L1 and L2 for causing the vehicle 5 to move to the parking point 30.

The steering angle correction instruction unit 85 corrects the parking direction 32 based on the second detection point groups 37. The steering angle correction instruction unit 85 also weights the second approximate straight lines 38 using the left and the right likelihoods and the likelihood of the parking point calculated based on the first detection point groups 34 and stored in the parking point and parking direction setting unit 82, and the likelihoods of the left and the right obstacles calculated based on the second detection point groups 37. In a case where the second detection point group 37 is divided into the first detection point small group 37a and the second detection point small group 37b across the center line 31 of the target parking position as a boundary, the steering angle correction instruction unit 85 assigns a higher weight to the detection point small group in which the likelihood of the detection point group distributed in a direction substantially parallel to the passage 27 is higher, than the detection point small group in which the likelihood is lower. In a case where the second detection point group 37 is divided into the first detection point small group 37a and the second detection point small group 37b across the center line 31 of the target parking position as a boundary, the steering angle correction instruction unit 85 assigns a higher weight to the detection point small group in which the number of the detection points distributed in the direction substantially parallel to the parking direction 32 is larger, than the detection point small group in which the number of the detection points is smaller. The steering angle correction instruction unit 85 also changes the correction amount of the parking direction 32 in accordance with the number of the detection points P distributed in the direction substantially parallel to the parking direction 32 at the parking point 30. The steering angle correction instruction unit 85 is an example of a correction circuit according to the present disclosure.

Processing Procedure Performed by Parking Support Device

Figure 18:
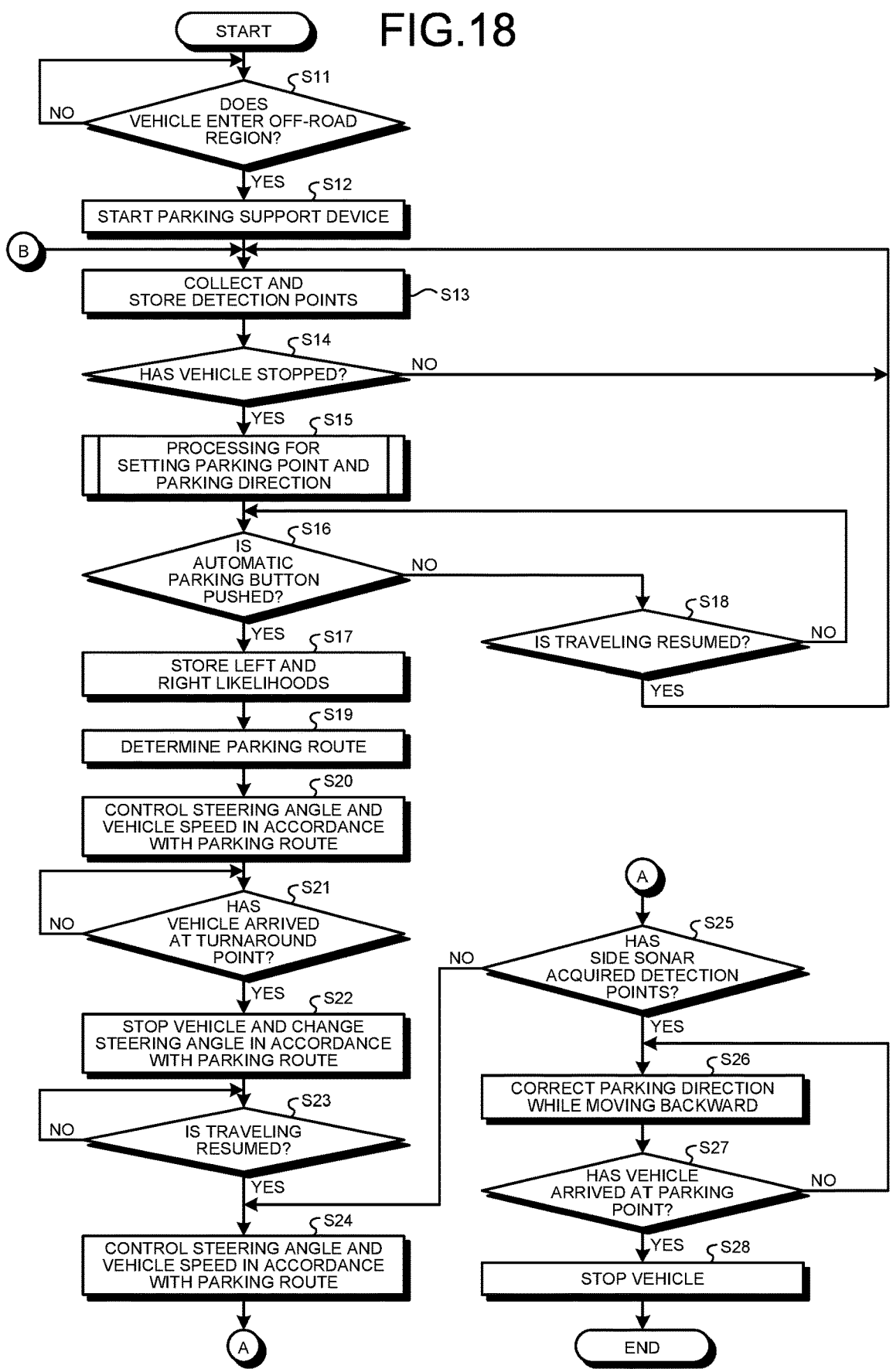
FIG. 18 is a flowchart illustrating an example of a processing procedure performed by the parking support device.

With reference to FIG. 18, the following describes a processing procedure performed by the parking support device 10. FIG. 18 is a flowchart illustrating an example of the processing procedure performed by the parking support device.

The traveling place acquisition unit 71 determines whether the vehicle 5 deviates from the road and enters the off-road region based on the current position of the vehicle 5 acquired from the positioning processing unit 17 (Step S11). If it is not determined that the vehicle 5 has entered the off-road region (No at Step S31), Step S11 is repeated.

If it is determined that the vehicle 5 has entered the off-road region at Step S11 (Yes at Step S31), the process proceeds to Step S12, and the traveling place acquisition unit 71 starts the parking support device 10 (Step S12). At Step S11, it is determined that the vehicle 5 has entered the off-road region, for example, a region that may be a parking lot, so that the parking support device 10 is started to enable automatic parking to be performed.

Subsequently, to detect a space allowing parking, the detection point acquisition unit 72 collects and stores the detection points P detected by the sonar module 12 (Step S13).

The mechanical sensor 11 (refer to FIG. 2A) determines whether the vehicle 5 has stopped (Step S14). If it is not determined that the vehicle 5 has stopped (No at Step S14), the process returns to Step S13. On the other hand, if it is determined that the vehicle 5 has stopped (Yes at Step S14), the process proceeds to the next Step S15. Herein, the vehicle 5 has stopped is interpreted as representation of an intention of the driver to park the vehicle.

The parking point and parking direction setting unit 82 performs processing for setting the parking point and the parking direction (Step S15). Although not illustrated in the drawings, it is preferable to make a notification of prompting the driver to make an instruction to perform automatic parking by an automatic parking button in a case in which the processing for setting the parking point and the parking direction is successfully performed, and in a case in which the setting processing is not successfully performed, it is preferable to insert a step of prompting the driver to move by displaying that there is no space allowing parking. A procedure of the processing for setting the parking point and the parking direction will be described later (refer to FIG. 19).

The operation unit 14 (refer to FIG. 2A) determines whether the automatic parking button is pushed (Step S16). If it is not determined that the automatic parking button is pushed (No at Step S16), the process proceeds to Step S18.

At Step 18, it is determined whether the vehicle 5 has resumed traveling (Step S18). If it is determined that the vehicle 5 has resumed traveling (Yes at Step S18), the process returns to Step S13. On the other hand, if it is not determined that the vehicle 5 has resumed traveling (No at Step S18), the process returns to Step S16.

If it is determined that the automatic parking button is pushed at Step S16, the structure estimation unit 74 stores the likelihoods of the obstacles on the left and right across the target parking position 33, for example, the obstacles to the front and the back of the vehicle 5 along the passage 27, for example, the left and the right likelihoods in the parking direction. At this point, the structure estimation unit 74 also stores the likelihood of the parking direction at the same time (Step S17).

Following Step S17, the parking route setting unit 84 determines the parking routes L1 and L2 (Step S19).

The vehicle control unit 16 (refer to FIG. 2A) causes the vehicle 5 to move forward along the parking route L1 by controlling the steering angle and the vehicle speed of the vehicle 5 (Step S20).

The mechanical sensor 11 determines whether the vehicle 5 has arrived at the turnaround point U (Step S21). If it is not determined that the vehicle 5 has arrived at the turnaround point U (No at Step S21), Step S21 is repeated. On the other hand, if it is determined that the vehicle 5 has arrived at the turnaround point U (Yes at Step S21), the process proceeds to Step S22.

At the turnaround point U, the vehicle control unit 16 causes the vehicle 5 to stop, and changes the steering angle in accordance with the parking route L2 (Step S22). At this point, the vehicle control unit 16 switches the shift position of the vehicle 5 to the reverse (R) position, and resumes traveling (Step S22).

The mechanical sensor 11 determines whether the vehicle 5 has resumed traveling (Step S23). If it is not determined that the vehicle 5 has resumed traveling (No at Step S23), Step S23 is repeated. On the other hand, if it is determined that the vehicle 5 has resumed traveling (Yes at Step S23), the process proceeds to Step S24.

The vehicle control unit 16 causes the vehicle 5 to move backward along the parking route L2 by controlling the steering angle and the vehicle speed of the vehicle 5 (Step S24).

The detection point acquisition unit 72 determines whether the side sonar has acquired the detection points P (Step S25). If it is not determined that the side sonar has acquired the detection points P (No at Step S25), the process returns to Step S24. On the other hand, if it is determined that the side sonar has acquired the detection points P (Yes at Step S25), the process proceeds to Step S26.

If it is determined that the side sonar has acquired the detection points P at Step S25, the steering angle correction instruction unit 85 instructs the vehicle control unit 16 to correct the parking direction while causing the vehicle 5 to move backward (Step S26).

The mechanical sensor 11 determines whether the vehicle 5 has arrived at the parking point 30 (Step S27). If it is not determined that the vehicle 5 has arrived at the parking point 30 (No at Step S27), the process returns to Step S26. On the other hand, if it is determined that the vehicle 5 has arrived at the parking point 30 (Yes at Step S27), the process proceeds to Step S28.

When the vehicle 5 has arrived at the parking point 30, the vehicle control unit 16 causes the vehicle 5 to stop (Step S28). The parking support device 10 then ends the processing in FIG. 18.

Procedure of Processing for Setting Parking Point and Parking Direction

Figure 19:
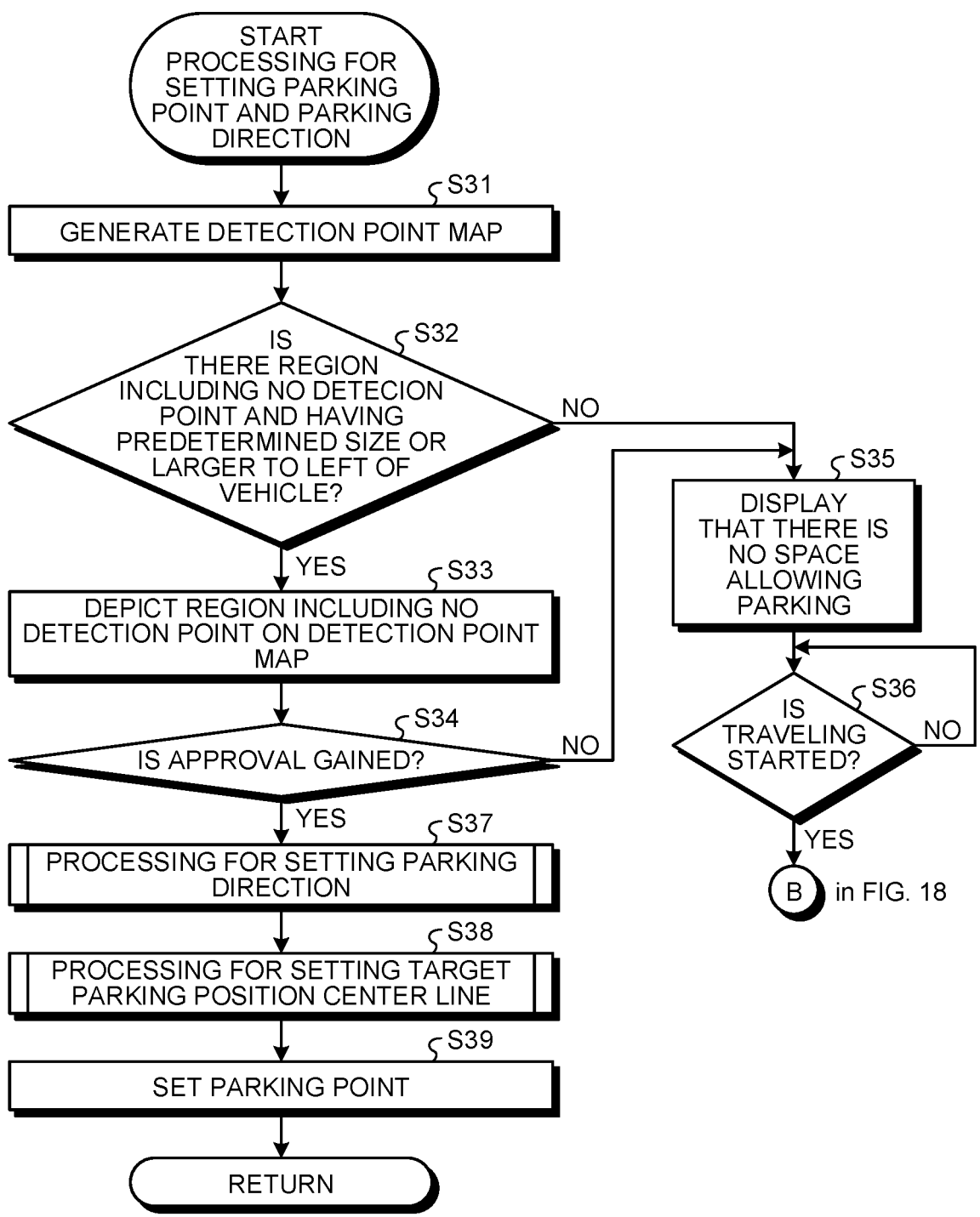
FIG. 19 is a flowchart illustrating an example of a procedure of processing for setting a parking point and the parking direction.

With reference to FIG. 19, the following describes the procedure of the processing for setting the parking point 30 and the parking direction 32 performed at Step S15 in FIG. 18. FIG. 19 is a flowchart illustrating an example of the procedure of the processing for setting the parking point and the parking direction.

The detection point acquisition unit 72 generates a detection point map of a predetermined range (Step S31). The detection point map is a distribution map of the detection points P illustrated in FIG. 5A and FIG. 5B, for example. The range of generating the detection point map may be appropriately set, for example, may be a range ranging from the side sonar at the front of the vehicle 5 as an apex, to the side in 8 m and the back in 8 m.

The detection point analysis unit 73 determines whether there is a region including no detection point P and having a predetermined size or larger to the left of the vehicle 5 (Step S32). If it is determined that there is the region having the predetermined size or more (Yes at Step S32), the process proceeds to Step S33. On the other hand, if it is not determined that there is the region having the predetermined size or more (No at Step S32), the process proceeds to Step S35. The region having the predetermined size is set to have a size equal to or larger than a size of a region in which the vehicle 5 can be parked. For example, the predetermined size is set to be equal to or more than 1.8 m in a front and back direction (equal to or more than the vehicle width of the vehicle 5), and equal to or more than 5 m in a lateral direction (equal to or more than the total length of the vehicle 5).

If it is determined that there is the region having the predetermined size or more at Step S32, the detection point analysis unit 73 depicts the region including no detection point P on the detection point map to be displayed on a display of the vehicle 5 (Step S33). Furthermore, the detection point analysis unit 73 requests the occupant of the vehicle 5 to approve automatic parking in the displayed region.

The operation unit 14 determines whether approval of the occupant of the vehicle 5 is gained (Step S34). If it is determined that approval of the occupant of the vehicle 5 is gained (Yes at Step S34), the process proceeds to Step S37. On the other hand, if it is not determined that approval of the occupant of the vehicle 5 is gained (No at Step S34), the process proceeds to Step S35. The approval of the occupant of the vehicle 5 is gained may be determined by the operation unit 14 detecting that an approval button is pushed, for example.

If it is determined that approval of the occupant of the vehicle 5 is gained at Step S34, the parking point and parking direction setting unit 82 performs processing for setting the parking direction 32 (Step S37). A procedure of the processing for setting the parking direction 32 will be described later (refer to FIG. 20).

Subsequently, the parking point and parking direction setting unit 82 performs processing for setting the center line 31 of the target parking position (Step S38). A procedure of the processing for setting the center line 31 of the target parking position will be described later (refer to FIG. 21).

Next, the parking point and parking direction setting unit 82 sets the parking point 30 (Step S39). For example, the parking point 30 is set so that, when the vehicle 5 is parked at the target parking position 33, the front end of the vehicle 5 is positioned on the approximate straight line obtained by linear approximation of the detection points P corresponding to a front end of an adjacent parked vehicle. Alternatively, the parking point 30 may be set at a nearer point having a predetermined distance from the approximate straight line obtained by linear approximation of the detection points P detected to the back of the target parking position 33. Thereafter, the parking point and parking direction setting unit 82 ends the processing in FIG. 19, and returns to Step S16 in FIG. 18. The automatic parking button at Step S16 in FIG. 18 may be the same button as the button for approving the parking region at Step S34 in FIG. 19. For example, the button functions as the approval button for the parking region when being pushed at the time when a request for approving the parking region is displayed, and functions as an instruction button for automatic parking when being pushed at the time when a request for instructing to perform automatic parking is displayed. With such a configuration, the driver can quickly start automatic parking by pushing the button two times without moving his/her hand.

If it is not determined that there is the region having the predetermined size or more at Step S32, the detection point analysis unit 73 displays that there is no space allowing parking (Step S35).

The mechanical sensor 11 determines whether the vehicle 5 has started traveling (Step S36). If it is determined that the vehicle 5 has started traveling (Yes at Step S36), the process returns to Step S13 in FIG. 18. At this point, the display to the effect that there is no space allowing parking, displayed at Step S35 is deleted. On the other hand, if it is not determined that the vehicle 5 has started traveling (No at Step S36), Step S36 is repeated.

Procedure of Processing for Setting Parking Direction

Figure 20:
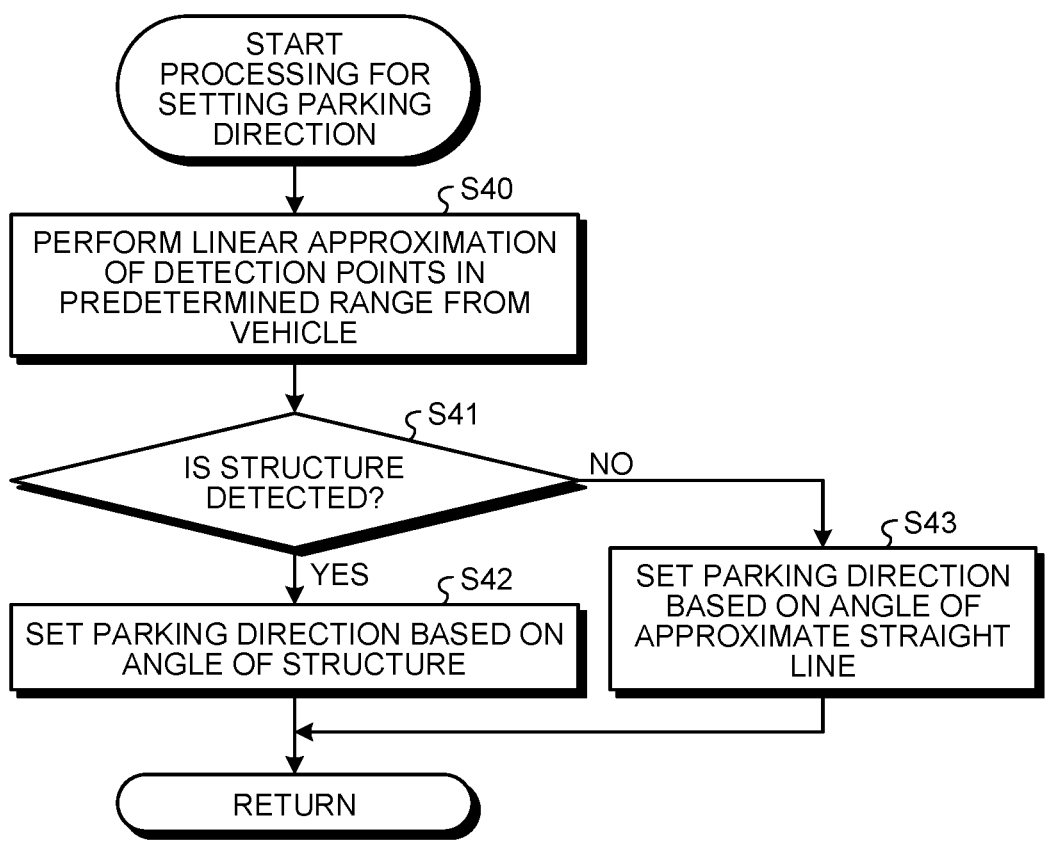
FIG. 20 is a flowchart illustrating an example of a procedure of processing for setting the parking direction.

With reference to FIG. 20, the following describes the procedure of the processing for setting the parking direction 32. The FIG. 20 is a flowchart illustrating an example of the procedure of the processing for setting the parking direction.

The structure estimation unit 74 applies the approximate straight line to the detection points P in a predetermined range (for example, at a distance equal to or less than 3 m) from the vehicle 5. More precisely, the detection point group distributed and extending along a direction substantially parallel to the longitudinal axis of the vehicle 5 is extracted, and linear approximation is performed for the extracted detection point group. The likelihood indicating a likelihood of the structure is then calculated based on a variation of the detection point group as a single item or a variation between the detection point groups (consistency of inclination of the approximate straight lines) (Step S40). At the subsequent Step S41, it is determined whether the structure is detected by comparing the likelihood with the predetermined threshold (Step S41). If it is determined that the structure is detected (Yes at Step S41), the process proceeds to Step S42. On the other hand, if it is not determined that the structure is detected (No at Step S41), the process proceeds to Step S43.

If it is determined that the structure is detected at Step S41, the parking point and parking direction setting unit 82 sets the parking direction 32 of the vehicle 5 based on the angle of the structure (Step S42). In a case in which a plurality of the structures are detected, weighting factors may be calculated based on the likelihoods (variations), and the angle as the standard may be calculated based on a weighted average using the weighting factors. Thereafter, the process returns to Step S38 in FIG. 19.

If the structure is not detected at Step S41, the parking point and parking direction setting unit 82 sets the parking direction 32 based on the angle of the approximate straight line of the detection point group the likelihood of which is the highest (Step S43). Thereafter, the process returns to Step S38 in FIG. 19.

Procedure of Processing for Setting Center Line of Target Parking Position

Figure 21:
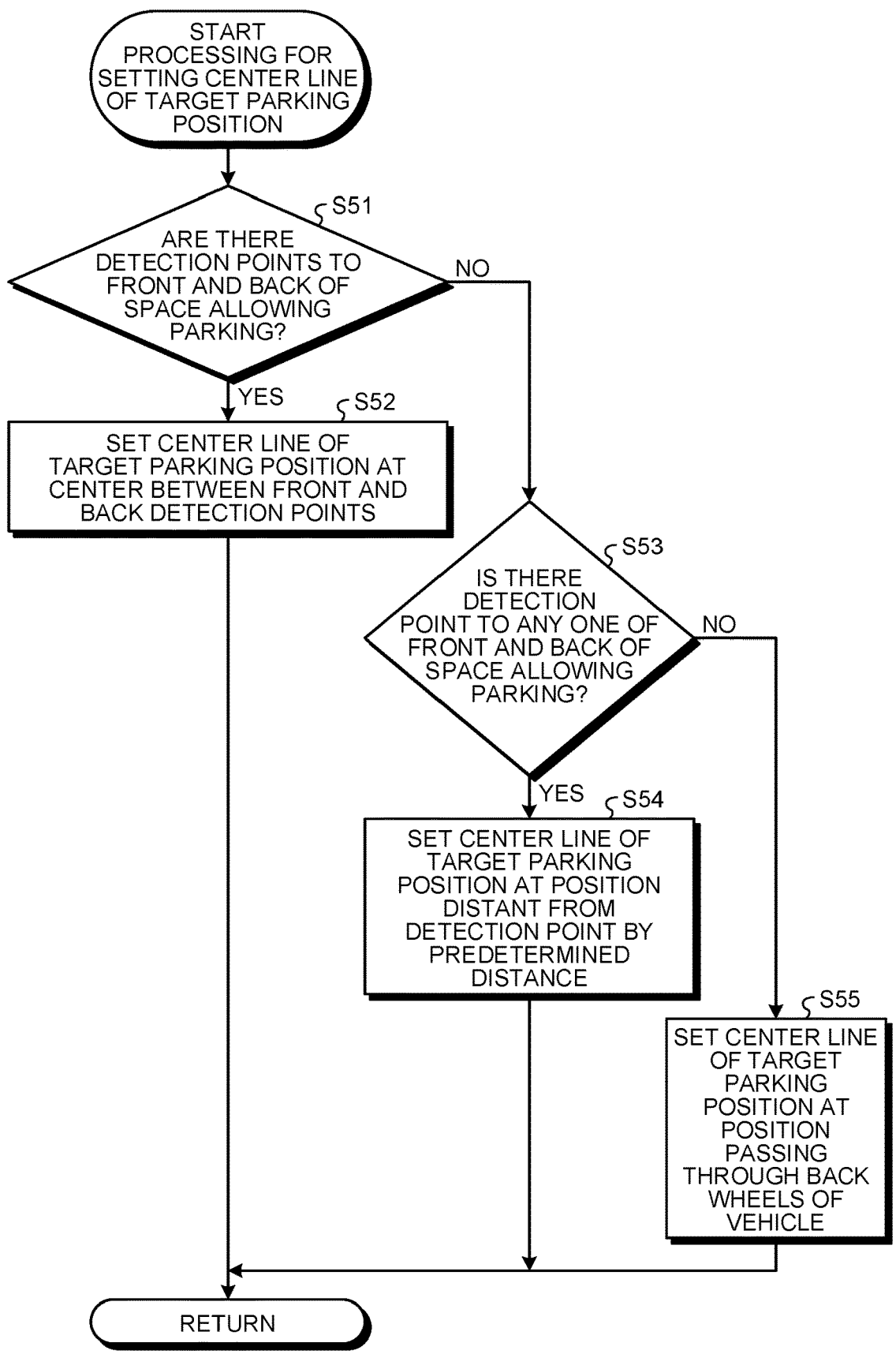
FIG. 21 is a flowchart illustrating an example of a procedure of processing for setting a center line of the target parking position.

With reference to FIG. 21, the following describes the procedure of the processing for setting the center line 31 of the target parking position. FIG. 21 is a flowchart illustrating an example of the procedure of the processing for setting the center line of the target parking position.

The detection point analysis unit 73 determines whether there are the detection points P in the front and back direction across the space allowing parking (a region in which there is no detection point P to a side of the vehicle 5 stopped in the passage 27) (Step S51). If it is determined that there are the detection points P in the front and back direction across the space (Yes at Step S51), the process proceeds to Step S52. If it is not determined that there are the detection points P in the front and back direction across the space (No at Step S51), the process proceeds to Step S53.

If it is determined that there are the detection points P in the front and back direction across the space at Step S51, the parking position center line setting unit 83 sets the center line 31 of the target parking position at the center between the front and the back detection points P. For example, a straight line parallel to the parking direction determined in the flow of FIG. 20 is set to be the center line 31 of the target parking position, where perpendiculars connecting the respective front and the back detection points P to the straight line have the same length (Step S52). Thereafter, the process returns to Step S39 in FIG. 19.

On the other hand, if it is not determined that there are the detection points P in the front and back direction across the space at Step S51, the detection point analysis unit 73 determines whether there is the detection point P to any one of the front and the back of the space allowing parking (Step S53). If it is determined that there is the detection point P to any one of the front and the back of the space allowing parking (Yes at Step S53), the process proceeds to Step S54. On the other hand, if it is not determined that there is the detection point P to any one of the front and the back of the space allowing parking (No at Step S53), the process proceeds to Step S55.

If it is determined that there is the detection point P to any one of the front and the back of the space allowing parking at Step S53, the parking position center line setting unit 83 sets the center line 31 of the target parking position at a position distant from the detection point P by a predetermined distance (for example, a position distant from the detection point P by 1 m). For example, a straight line that is parallel to the parking direction determined in the flow of FIG. 20 and distant from the detection point P by 1 m in a direction of the space allowing parking is set to be the center line 31 of the target parking position (Step S54). Thereafter, the process returns to Step S39 in FIG. 19.

On the other hand, at Step S53, if it is not determined that there is the detection point P to any one of the front and the back of the space allowing parking, the parking position center line setting unit 83 sets the center line 31 of the target parking position at a position passing through back wheels of the vehicle 5 (Step S55). Thereafter, the process returns to Step S39 in FIG. 19.

Working Effects of First Embodiment

As described above, the parking support device 10 according to the first embodiment is the parking support device that supports side-by-side parking of the vehicle 5 in the parking region positioned to the side of the passage, and includes: the detection point acquisition unit 72 (acquisition circuit) that acquires information on the detection points indicating the positions at which the obstacles around the vehicle 5 are detected; a detection point analysis unit 73 (analysis circuit) that divides the detection points into the detection point groups, calculates the approximate straight line corresponding to each of the detection point groups, and calculates the variation of the detection points with respect to the approximate straight line calculated from each of the detection point groups; the parking point and parking direction setting unit 82 (setting circuit) that sets the parking point 30 at which the vehicle 5 is parked based on the detection points, and sets the parking direction 32 as the direction of the vehicle 5 at the parking point 30 based on the approximate straight line and the variation; and the steering angle correction instruction unit 85 (correction circuit) that corrects the parking direction 32 after setting the parking direction 32. The detection point acquisition unit 72 acquires the first detection points P before setting the parking direction 32, and acquires the second detection points P after setting the parking direction 32 from among the detection points. The detection point analysis unit 73 divides the first detection points P into the first detection point groups 34, divides the second detection points P into the second detection point groups 37, calculates the first approximate straight lines 35 for the respective first detection point groups 34, calculates the second approximate straight lines 38 for the respective second detection point groups 37, calculates the first variation 36 of the first detection point group 34 with respect to each of the first approximate straight lines 35, and calculates the second variation 39 of the second detection point group 37 with respect to each of the second approximate straight line 38. The parking point and parking direction setting unit 82 sets the parking point 30 based on the first detection points P, and sets the parking direction 32 based on the first approximate straight line 35 and the first variation 36. The steering angle correction instruction unit 85 weights each of the second approximate straight lines 38 based on the second variation 39, calculates the correction amount of the parking direction 32 using the weighted second approximate straight line 38, and corrects the parking direction 32 using the correction amount. Accordingly, automatic parking can be performed with a more appropriate vehicle attitude.

The parking support device 10 according to the first embodiment further includes the structure estimation unit 74 (estimation circuit) that calculates the likelihood indicating a likelihood of estimating each of the first detection point groups 34 and the second detection point groups 37 to be the detection point group indicating the structure, and the steering angle correction instruction unit 85 further weights each of the second approximate straight lines 38 using the likelihood calculated from the second detection point groups 37. Thus, in a case in which there is the structure such as the rectangular column 7 adjacent to the parking space, automatic parking can be performed so that the vehicle body is substantially parallel to the side surface of the rectangular column 7.

In the parking support device 10 according to the first embodiment, the structure estimation unit 74 (estimation circuit) calculates the likelihood for the detection point group having a smaller variation so as to be higher than for the detection point group having a larger variation of the first variation 36 and the second variation 39. Thus, it is possible to reliably recognize that the structure such as the rectangular column 7 is adjacent to the parking space based on the calculated likelihoods.

In the parking support device 10 according to the first embodiment, the structure estimation unit 74 (estimation circuit) calculates the likelihood for the approximate straight line substantially parallel to or substantially perpendicular to the other approximate straight line so as to be higher than for the approximate straight line that is not substantially parallel to or substantially perpendicular to the other approximate straight line of the first approximate straight lines 35 and the second approximate straight lines 38. Thus, it is possible to reliably identify the structure such as the rectangular column 7 the adjacent surfaces of which are orthogonal to each other, and the parked vehicle 6 the corners of which are rounded.

In the parking support device 10 according to the first embodiment, the structure estimation unit 74 (estimation circuit) calculates the likelihood for the detection point group in which the ratio of the length of the straight line section 40 of the detection point group to the width of the detection point group is larger, so as to be higher than the detection point group in which the ratio of the length of the straight line section 40 is smaller. Thus, it is possible to reliably identify the structure such as the rectangular column 7 the adjacent surfaces of which are orthogonal to each other, and the parked vehicle 6 the corners of which are rounded.

In the parking support device 10 according to the first embodiment, in a case where the second detection point group 37 is divided into the first detection point small group 37a and the second detection point small group 37b based on the parking direction 32 at the parking point 30, the steering angle correction instruction unit 85 (correction circuit) assigns a higher weight to the detection point small group for which the likelihood that it is distributed in a direction substantially parallel to the passage 27 is higher, than to the detection point small group for which the likelihood is lower. Thus, the vehicle can be parked along the structure such as the rectangular column 7 adjacent to the target parking position 33.

In the parking support device 10 according to the first embodiment, in a case where the second detection point group 37 is divided into the first detection point small group 37a and the second detection point small group 37b based on the parking direction 32 at the parking point 30, the steering angle correction instruction unit 85 (correction circuit) assigns a higher weight to the detection point small group in which the number of the detection points distributed in the direction substantially parallel to the parking direction 32 is larger, than the detection point small group in which the number of the detection points is smaller. Thus, the obstacle having a higher likelihood among the obstacles adjacent to the parking space can be used as the standard of the parking direction.

In the parking support device 10 according to the first embodiment, the parking point and parking direction setting unit 82 (setting circuit) calculates a weight for the first approximate straight line 35 based on the first variation 36, and sets the parking direction 32 using the weight for the first approximate straight line 35 and the direction of the first approximate straight line 35. Accordingly, it is possible to set the parking direction 32 more appropriately in accordance with a disposition state of the obstacles around the target parking position 33.

In the parking support device 10 according to the first embodiment, the steering angle correction instruction unit 85 (correction circuit) changes the correction amount in accordance with the number of the detection points P distributed in the direction substantially parallel to the parking direction 32 at the parking point 30. Thus, the parking direction 32 can be corrected by increasing the weight assigned to one in which the number of the detection points P is larger.

In the parking support device 10 according to the first embodiment, the detection point acquisition unit 72 (acquisition circuit) acquires the reception strength waveform indicating a change of the reception strength I with respect to the time, and the structure estimation unit 74 (estimation circuit) estimates the likelihood based on the reception strength waveform. Thus, it is possible to reliably determine the possibility that the obstacle is the structure such as the rectangular column 7 based on the reception strength waveform of the sonar.

The first embodiment exemplifies the case in which the vehicle 5 is parked in the parking space to the left of the traveling direction, but the parking support device 10 similarly works also in a case in which the vehicle 5 is parked in a parking space to the right of the traveling direction. Specifically, at Step S13 in FIG. 18, the side sonar collects the detection points P from both of the left and the right of the vehicle 5. In a case in which a parking space allowing parking is found to the right of the vehicle 5, the parking support device 10 sets a parking route along which the vehicle is steered to the left and moves forward from the current position to reach the turnaround point, and a parking route along which the vehicle moves backward toward the target parking position set to the right of the traveling direction of the vehicle 5 after switching the shift position to the reverse (R) position at the turnaround point. The parking support device 10 then performs the same steering angle control as described above to cause the vehicle 5 to be automatically parked at the target parking position to the right of the traveling direction.

Second Embodiment

Figure 22:
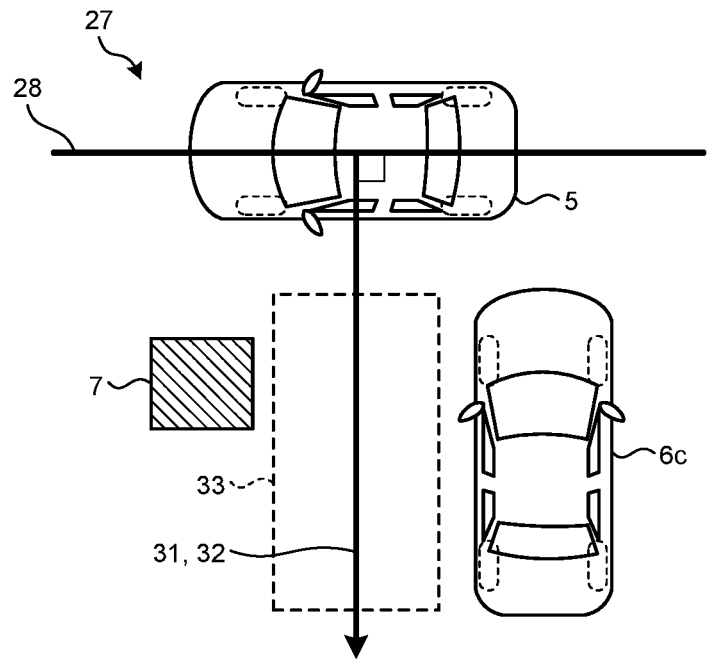
FIG. 22 is a diagram for explaining a target parking position set by a parking support device according to a second embodiment.
Figure 23:
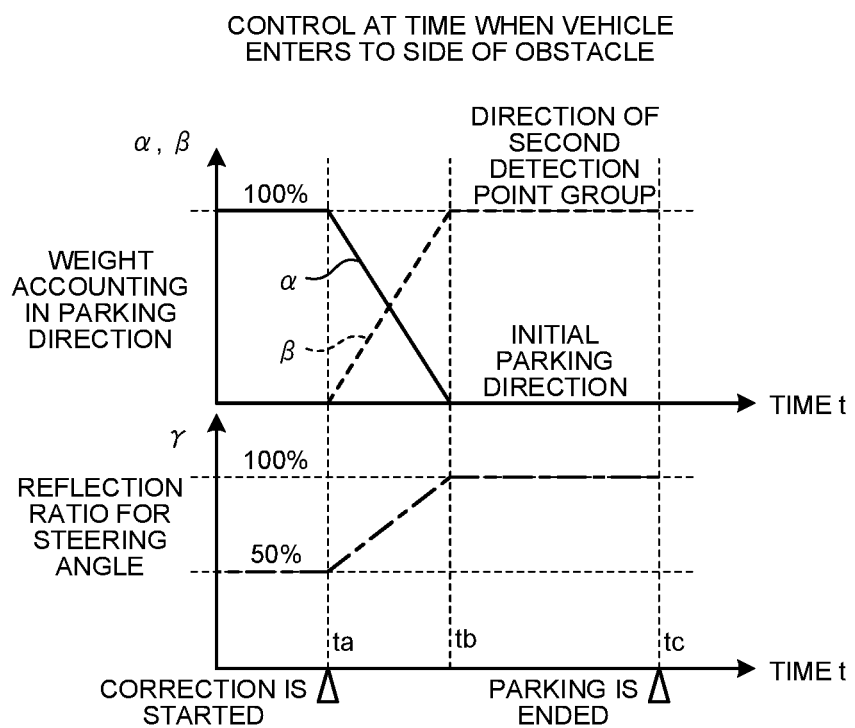
FIG. 23 is a diagram for explaining a method for controlling a correction amount of a steering angle of a vehicle by the parking support device according to the second embodiment.

The following describes a second embodiment of the parking support device according to the present disclosure with reference to FIG. 22 and FIG. 23.

The parking support device according to the second embodiment performs automatic parking while omitting the processing corresponding to the first step from the automatic parking described in the first embodiment. For example, the parking support device according to the second embodiment omits the processing of traveling along the passage 27 in the parking lot, acquiring the detection points indicating the positions of the obstacles around the vehicle 5 by the sonar modules 12, and setting the target parking position 33 based on arrangement of the acquired detection points.

As illustrated in FIG. 22, the parking support device according to the second embodiment causes the vehicle to stop in the vicinity of a space in which the driver desires to park the vehicle (a space between the rectangular column 7 as the structure and the parked vehicle 6c), designates a parking region (in a case of FIG. 22, to the left of the vehicle 5), and causes the vehicle to turn by 90° to the designated side and move backward to be parked side by side. In the first embodiment, the target parking position 33 is set by detecting the rectangular column 7 and the parked vehicle 6c, but in this case, the parking support device sets the target parking position 33 based on the vehicle 5. For example, a direction passing through the center in the front and back direction of the vehicle 5 and being orthogonal to the longitudinal axis 28 of the vehicle 5 is set to be the center line 31 of the target parking position and the parking direction 32. A region corresponding to the vehicle width of the vehicle 5 with respect to the center line 31 of the target parking position is set to be the target parking position 33. Alternatively, the target parking position 33 may be presented to the driver via the operation unit (HMI) 14, and the driver may be enabled to optionally correct the parking region.

Thereafter, as described above with reference to FIG. 4, the parking support device sets the parking route L1 for moving forward by steering the steering angle of the vehicle 5 to the right to reach the turnaround point U, and the parking route L2 for switching the shift position to the reverse (R) position at the turnaround point U to move backward toward the target parking position 33.

The parking support device then receives an instruction to start parking from the occupant of the vehicle 5, and starts to move along the parking routes L1 and L2. At the time of moving backward along the parking route L2, the parking support device can cause the vehicle 5 to be parked in a substantially preferable state by detecting an angle and a distance to the left and the right obstacles by the side sonar and correcting the attitude of the vehicle 5.

In a scheme of automatic parking according to the second embodiment, at the time of correcting the attitude of the vehicle 5, the parking support device does not use the detection points facing the passage 27 but uses the detection points facing the target parking position 33 among the detection points of the rectangular column 7 or the parked vehicle 6c. For example, the likelihood calculated from the detection point group facing the passage 27 among the detection point groups of the rectangular column 7 and the parked vehicle 6c is low, so that it is difficult to determine which of the rectangular column 7 and the parked vehicle 6c is used as the standard based on the likelihoods calculated from the rectangular column 7 and the parked vehicle 6c. This corresponds to a case in which the likelihood of the parking direction 32 is low in the scheme of automatic parking according to the first embodiment. Thus, the parking support device performs steering angle control corresponding to the case in which the likelihood of the parking direction 32 is low according to the first embodiment.

For example, as illustrated in FIG. 23, the parking direction 32 may be suddenly changed at the time ta when the steering angle starts to be controlled, so that the reflection ratio γ for reflecting the difference between the angle of the vehicle 5 and the parking direction 32 in the steering angle of the vehicle 5 is suppressed to be 50% until the time ta when correction is started. As detection of the side surface of the obstacle adjacent to the target parking position 33 proceeds, the reflection ratio is monotonously increased. After the time tb, the reflection ratio γ for the steering angle is caused to be 100%. The time ta for staring correction may be, for example, a time when the number of the detected detection points P reaches a threshold, or a time when a moving distance of the vehicle 5 after the parking support device starts to detect the detection points P reaches a threshold.

Similarly to the case in which the likelihood of the parking direction 32 is low, the parking support device reflects the angle of the side surface of the obstacle adjacent to the target parking position 33 in the steering angle of the vehicle 5 more rapidly than the case in which the likelihood of the parking direction 32 is high. Thus, as illustrated in FIG. 23, the weighting factor α for the parking direction 32 that is initially set and the weighting factor β for the direction of the second detection point group detected at the time when the vehicle 5 moves backward are reversed by the time tb, and the parking direction is determined in accordance with the direction of the second detection point group.

At the time of moving backward along the parking route L2 and starting to detect the left and the right obstacles, the parking support device calculates the likelihoods of the obstacles, and controls the steering angle of the vehicle 5 to be along the side surface of the obstacle the likelihood of which is higher (for example, the rectangular column 7). At the time of calculating the direction of the second detection point group by an weighted average, the weight assigned to the left detection point group and the weight assigned to the right detection point group are determined in accordance with the likelihoods of the detection point groups of the side surfaces of the obstacles because there is no information on the detection point group (first detection point group) closer to the passage. At this point, the weights may be calculated based on the likelihoods of the detection point groups of the side surfaces of the obstacles, or each of the weights at the time ta when the steering angle starts to be controlled may be assumed to be 50%, and the weights may be shifted to the weights calculated from the likelihoods of the detection point groups of the side surfaces of the obstacles in accordance with an increase in the number of the detection points of the second detection point groups during a period between ta and tb.

A hardware configuration and a functional configuration of the parking support device according to the present embodiment are the same as those of the parking support device 10 according to the first embodiment, but content of the processing to be performed is different from that in the first embodiment. For example, regarding the parking support device according to the present embodiment, the processing of traveling along the passage 27, acquiring the detection points P indicating the positions of the obstacles around the vehicle 5 by the sonar modules 12, and setting the target parking position 33 based on arrangement of the acquired detection points P is omitted from the processing performed by the parking support device 10 at the first step.

Working Effects of Second Embodiment

As described above, the parking support device according to the second embodiment sets the target parking position 33 formed by the parking direction 32 and the center line 31 of the target parking position just beside the stop position of the vehicle 5, and sets the parking routes L1 and L2 from the stop position to the target parking position 33. The parking support device then calculates the correction amount of the parking direction 32 based on the likelihoods of the left and the right obstacles that are detected at the time of moving backward along the parking route L2, and corrects the parking direction 32 using the correction amount. Accordingly, it is possible to implement simpler automatic parking than the automatic parking described in the first embodiment.

In the above description, wording of " . . . unit" used for each constituent element may be replaced by other wording such as " . . . circuit (circuitry)", " . . . device", " . . . unit", or " . . . module".

Each of the functional blocks used in the explanation of the embodiments described above is typically implemented as an LSI, which is an integrated circuit. The integrated circuit may control the functional blocks used in the explanation of the embodiments described above, and may include an input and an output. The integrated circuit may be individually made into one chip, or the integrated circuit may be made into one chip including part or all of the functional blocks. Herein, the functional block is assumed to be the LSI, but it may be called an IC, a system LSI, a super LSI, or an ultra LSI depending on a difference in integration. A method for making an integrated circuit is not limited to the LSI, but may be implemented by using a dedicated circuit or a general-purpose processor. After manufacturing the LSI, a field programmable gate array (FPGA) that can be programmed, or a reconfigurable processor in which connection and setting of a circuit cell inside the LSI can be reconfigured may be used. Furthermore, if there will be developed a technique of making an integrated circuit replacing the LSI due to advance of a semiconductor technique or another technique derived therefrom, the functional blocks may be integrated using the other technique, obviously. Biotechnology may be applied, for example.

With the parking support device according to the present disclosure, automatic parking can be performed with a more appropriate vehicle attitude.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking support device configured to support side-by-side parking of a vehicle in a parking region positioned to a side of a passage, the parking support device comprising:

an acquisition circuit configured to acquire information on detection points indicating positions at which obstacles around the vehicle are detected;

an analysis circuit configured to divide the detection points into detection point groups, calculate approximate straight lines each corresponding to one of the detection point groups, and calculate variations of detection points with respect to the approximate straight lines each calculated from one of the detection point groups;

a setting circuit configured to set a parking point at which the vehicle is to be parked based on the detection points, and set a parking direction that is to be a direction of the vehicle at the parking point, based on the approximate straight lines and the variations; and a correction circuit configured to correct the parking direction after setting the parking direction, wherein the acquisition circuit is configured to acquire, from among the detection points, first detection points before setting the parking direction, and acquires second detection points after setting the parking direction, the analysis circuit is configured to divide the first detection points into first detection point groups, divide the second detection points into second detection point groups, calculate first approximate straight lines for the first detection point groups, calculates second approximate straight lines for the second detection point groups, calculate first variations of the first detection point groups with respect to the first approximate straight lines, and calculate second variations of the second detection point groups with respect to the second approximate straight lines, the setting circuit is configured to set the parking point based on the first detection points, and set the parking direction based on the first approximate straight lines and the first variations, and the correction circuit is configured to weight the second approximate straight lines based on the second variations, calculate a correction amount of the parking direction using the weighted second approximate straight lines, and correct the parking direction using the correction amount.

2. The parking support device according to claim 1, further comprising an estimation circuit, wherein the estimation circuit is configured to calculate likelihoods indicating likelihoods of estimating the first detection point groups and the second detection point groups to be a detection point group indicating a structure, and the correction circuit is configured to further weight the second approximate straight lines using likelihoods calculated from the second detection point groups.

3. The parking support device according to claim 2, wherein the estimation circuit is configured to calculate a likelihood for a detection point group having a smaller variation so as to be higher than for a detection point group having a larger variation among the first variations and the second variations.

4. The parking support device according to claim 2, wherein the estimation circuit is configured to calculate a likelihood for an approximate straight line substantially parallel to or substantially perpendicular to another approximate straight line so as to be higher than for an approximate straight line that is not substantially parallel to or substantially perpendicular to any other approximate straight lines among the first approximate straights line and the second approximate straight lines.

5. The parking support device according to claim 2, wherein the estimation circuit is configured to calculate a likelihood for a detection point group in which a ratio of a length of a straight line section in the detection point group to a width of the detection point group is larger, so as to be higher than for a detection point group in which the ratio is smaller.

6. The parking support device according to claim 2, wherein the correction circuit is configured to assign a higher weight to a detection point small group for which a likelihood that it is distributed in a direction substantially parallel to the passage is higher, than to a detection point small group for which the likelihood is lower, in a case where the second detection point groups are divided into a first detection point small group and a second detection point small group based on the parking direction at the parking point.

7. The parking support device according to claim 2, wherein the correction circuit is configured to assign a higher weight to a detection point small group in which a number of detection points distributed in a direction substantially parallel to the parking direction is larger, than to the detection point small group in which the number of the detection points is smaller, in a case where the second detection point groups are divided into a first detection point small group and a second detection point small group based on the parking direction at the parking point.

8. The parking support device according to claim 2, wherein the setting circuit is configured to calculate weights for the first approximate straight lines based on the first variations, and set the parking direction using the weights for the first approximate straight lines and directions of the first approximate straight lines.

9. The parking support device according to claim 2, wherein the correction circuit is configured to change the correction amount in accordance with a number of detection points distributed in a direction substantially parallel to the parking direction at the parking point.

10. The parking support device according to claim 2, wherein
  the acquisition circuit is configured to acquire a reception strength waveform indicating a change of a reception strength with respect to a time, and
  the estimation circuit is configured to estimate the likelihood based on the reception strength waveform.

* * * * *